US011869040B2

(12) United States Patent
Tolomei et al.

(10) Patent No.: US 11,869,040 B2
(45) Date of Patent: Jan. 9, 2024

(54) METHOD AND SYSTEM FOR ANALYZING USER BEHAVIOR ASSOCIATED WITH WEB CONTENTS

(71) Applicant: YAHOO AD TECH LLC, Dulles, VA (US)

(72) Inventors: Gabriele Tolomei, London (GB); Ayman Farahat, Santa Clara, CA (US); Mounia Lalmas, London (GB)

(73) Assignee: YAHOO AD TECH LLC, Dulles, VA (US)

( * ) Notice: Subject to any disclaimer, the term of this patent is extended or adjusted under 35 U.S.C. 154(b) by 478 days.

(21) Appl. No.: 14/755,399

(22) Filed: Jun. 30, 2015

(65) Prior Publication Data

US 2017/0004541 A1 Jan. 5, 2017

(51) Int. Cl.
*G06Q 30/0273* (2023.01)
*G06Q 30/0242* (2023.01)
*G06Q 10/067* (2023.01)
*G06F 3/0481* (2022.01)

(52) U.S. Cl.
CPC ....... *G06Q 30/0273* (2013.01); *G06F 3/0481* (2013.01); *G06Q 10/067* (2013.01); *G06Q 30/0246* (2013.01); *G06Q 30/0275* (2013.01)

(58) Field of Classification Search
CPC ............... G06Q 30/0256; G06Q 30/02; G06Q 30/0241; G06Q 30/0273; G06Q 30/0275; G06Q 30/0246; G06Q 10/067; G06F 3/0481
See application file for complete search history.

(56) References Cited

U.S. PATENT DOCUMENTS

| 8,214,365 | B1 * | 7/2012 | Manadhata | G06F 21/566 707/737 |
| 8,346,607 | B1 | 1/2013 | Benson et al. | |
| 8,566,152 | B1 * | 10/2013 | Shaw | G06Q 30/02 705/14.1 |
| 8,645,367 | B1 | 2/2014 | Hajaj et al. | |
| 8,865,565 | B2 * | 10/2014 | Chen | H01L 33/007 438/458 |

(Continued)

OTHER PUBLICATIONS

Yi et al., "Beyond Clicks: Dwell Time for Personalization" (published in RecSys '14: Proceedings of the 8th ACM Conference on Recommender systems, Oct. 2014, pp. 113-120) (Year: 2014).*

(Continued)

*Primary Examiner* — Resha Desai
*Assistant Examiner* — Patrick Kim
(74) *Attorney, Agent, or Firm* — Venable LLP

(57) ABSTRACT

The present teaching relates to analyzing user behavior associated with web contents. Information related to user interactions associated with a content item placed on a reference property is first obtained. A measurement associated with each user interaction of the content item is determined based on the obtained information. An analyzing model for the content item which characterizes statistics of the measurements associated with the content item is further constructed. A measurement threshold to be used to determine a cost of placing the content item on a target property is further determined using the constructed analyzing model.

19 Claims, 32 Drawing Sheets

(56) References Cited

U.S. PATENT DOCUMENTS

| | | | | |
|---|---|---|---|---|
| 8,868,565 | B1* | 10/2014 | Zhong | G06F 16/353 |
| | | | | 707/769 |
| 2008/0270154 | A1 | 10/2008 | Klots | |
| 2008/0281808 | A1* | 11/2008 | Anderson | G06F 17/30864 |
| 2008/0306830 | A1 | 12/2008 | Lasa | |
| 2009/0327032 | A1* | 12/2009 | Gunawardana | G06Q 30/02 |
| | | | | 705/14.42 |
| 2010/0082566 | A1* | 4/2010 | Wang | G06F 16/951 |
| | | | | 707/E17.014 |
| 2012/0143790 | A1 | 6/2012 | Wang et al. | |
| 2013/0173573 | A1* | 7/2013 | Song | G06F 16/951 |
| | | | | 707/706 |
| 2015/0142557 | A1* | 5/2015 | Krishnamurthy | G06Q 30/0246 |
| | | | | 705/14.45 |
| 2015/0154650 | A1* | 6/2015 | Umeda | G06Q 30/08 |
| | | | | 705/14.68 |
| 2015/0161255 | A1* | 6/2015 | Battle | H04L 67/30 |
| | | | | 707/706 |
| 2015/0213361 | A1* | 7/2015 | Gamon | G06N 20/00 |
| | | | | 706/12 |
| 2016/0019282 | A1 | 1/2016 | Lewis | |
| 2017/0293416 | A1* | 10/2017 | Roskind | H04L 67/01 |

OTHER PUBLICATIONS

Tolomei, Gabriele et al., A Data-driven Methodology to Detect Accidental Clicks on Homerun IOS App, Mar. 17, 2015.
Farahat, Ayman et al., A System and Method for Mobile Advertising Supply Discounting, Jan. 2015.
Office Action dated Nov. 21, 2017 in U.S. Appl. No. 14/755,483.
Office Action dated Apr. 17, 2018 in U.S. Appl. No. 14/755,483.
Office Action dated Sep. 13, 2019 in U.S. Appl. No. 14/755,483.
Office Action dated Mar. 5, 2020 in U.S. Appl. No. 14/755,483.
Office Action dated Sep. 18, 2020 in U.S. Appl. No. 14/755,483.
Nottorf, "Which Clicks Lead to Conversions? Modeling User-journeys Across Multiple Types of Online Advertising" (published in 2013 International Conference on e-Business on Jul. 1, 2013) (Year: 2013).
Notice of Allowance dated Jun. 25, 2021 in U.S. Appl. No. 14/755,483.

* cited by examiner

|  |  | # Ads | # Clicks | # Clicks (after filtering) |
|---|---|---|---|---|
| Nov-Dec '14 | Homerun | 2,250 | 2.29M | 2.01M (-12.4%) |
|  | Mail | 8,275 | 6.93M | 4.38M (-36.7%) |
|  | Fantasy Sport | 143 | 54.4K | 40.1K (-26.2%) |
| Jan-Feb '15 | Homerun | 1,852 | 1.45M | 1.12M (-22.4%) |
|  | Mail | 8,203 | 6.48M | 3.87M (-40.3%) |
|  | Fantasy Sport | / | / | / |

FIG. 5

| | 1 component | 2 components | 3 components |
|---|---|---|---|
| Nov-Dec '14 | 1.0% | 16.5% | 82.5% |
| Jan-Feb '15 | 2.9% | 31.7% | 65.4% |

FIG. 7B

|  | Nov-Dec '14 | Jan-Feb '15 |
|---|---|---|
| #Ads | 1,368 | 1,211 |
| Min | 1,196 | 1,215 |
| 1st Quartile | 1,953 | 1,850 |
| Median | 2,244 | 2,113 |
| Mean | 4,970 | 4,104 |
| 3rd Quartile | 3,730 | 2,911 |
| Max | 104,796 | 43,338 |

FIG. 12

|  |  | Acc. Clicks using $t_{mean}$ (%) | Acc.Clicks using $t_{median}$ (%) |
|---|---|---|---|
| Nov-Dec '14 | Homerun | 13.5 | 7.8 |
|  | Mail | 62.7 | 42.6 |
|  | Fantasy Sport | 64.2 | 41.8 |
| Jan-Feb '15 | Homerun | 13.8 | 8.0 |
|  | Mail | 59.7 | 45.9 |
|  | Fantasy Sport | / | / |

FIG. 16

| (Conversions) | (Obs) | (Mean) | (Std Err) | (Std. Dev.) |
|---|---|---|---|---|
| 0 | 178152 | 3.263826 | .0060876 | 2.569438 |
| 1 | 1635 | 5.729205 | .0638591 | 2.582149 |

FIG. 26

| | (Linear) fixed | (Logit) fixed | (Linear) ran inter | (Linear) ran coeff | (Logit) ran inter | (Logit) ran coeff |
|---|---|---|---|---|---|---|
| main | | | | | | |
| logdwell | 0.00413 | 0.301 | 0.00413 | 0.00552 | 0.3007 | 0.2491 |
| | (41.99) | (36.71) | (42.04) | (5.35) | (36.88) | (9.12) |
| Constant | -0.00384 | -6.424 | 0.000527 | -0.00440 | -6.176 | -6.0115 |
| | (-3.06) | (-27.68) | (0.24) | (-2.82) | (-29.55) | (-35.04) |
| AIC | | 14297 | | 14398.9 | | 14312.8 |
| Observations | 179787 | 179787 | 179787 | 179787 | 179787 | 179787 |

FIG. 27

METHOD AND SYSTEM FOR ANALYZING USER BEHAVIOR ASSOCIATED WITH WEB CONTENTS

CROSS-REFERENCE TO RELATED APPLICATION

The present application is related to U.S. patent application Ser. No. 14/755,483 filed on Jun. 30, 2015, entitled "METHOD AND SYSTEM FOR PROVIDING CONTENT SUPPLY ADJUSTMENT", the contents of which are hereby incorporated by reference in its entirety.

BACKGROUND

1. Technical Field

The present teaching relates to methods, systems, and programming for user behaviors associated with internet web pages. In particular, the present teaching relates to methods, systems, and programming for analyzing user interactions associated with contents placed on the web pages.

2. Discussion of Technical Background

Pay Per Performance (PPF) models such as Price Per Click (PPC) are very popular with online advertisers. The primary appeal of PPC is that advertisers will only pay when a user ends up clicking and subsequently visiting the landing page on the advertiser's web site. However, the Achilles heel of PPC is that users can accidentally click on the advertiser's ad, get redirected to the landing page and bounce back. This is even more severe on mobile devices such as smartphones. As the value of those clicks is questionable, advertisers are used to complaining because they are anyway charged for accidental clicks.

To address this issue, clicks can be discounted in inverse proportion to the ratio of accidental to total clicks. The main idea is to label visits shorter than a certain threshold as "accidental". For example, one advertiser, or more precisely, the advertiser's web analytics software, might declare that all visits shorter than five seconds are accidental. However, the challenge with this approach is that the threshold is set arbitrarily, and does not take into account empirically observed user behaviors. In fact, while five seconds could be a reasonable threshold for a user accessing the ad landing page on a desktop device, it might be significantly different for a mobile device.

One can argue that conversion data could be used to directly compute discount factors, i.e., an advertiser should be fully charged only for those clicks which actually led to conversion whereas discounting all the remaining clicks. In order to implement this strategy, an accurate estimate of the conversion rate (i.e., the probability of conversion given a click) is needed. However, conversion rate suffers from three major problems. First, the conversion data is often not available for a large number of advertisers who simply do not want to share this information, thereby making harder to fairly compute an estimate of the conversion rate. Second, the conversion data is not missing at random, i.e., we cannot simply use the advertisers that share conversion data as a representative set. Third, as we are assuming a PPC cost model, a click which does not lead to a conversion is not necessarily a bad click for the advertiser. In fact, such a click may represent a valuable feedback for the advertiser. Therefore, if clicks are discounted by just looking at the conversion rate, it might end up charging the advertiser less (or not charging it at all) for those clicks which are in fact non-accidental, perhaps making the advertiser happier but loosing potential revenues for the publishers.

Further, advertisers are interested in reaching a large number of potential customers. Additional supply sources can increase the reach and scale of advertising campaigns. However, different supply sources can have different performances and by implication different return on investment for the advertisers. To address this issue, advertisers give discount the clicks in proportion to the performance where the performance is typically measured by click to conversion rates. However, conversion data is often not available and furthermore is not missing at random.

In order to help the advertisers reach as many of their potential customers, it is natural to look for additional supply sources e.g., through syndication partners. However, with syndication comes the problem of varying quality. For example, while it might take 10 clicks to get a conversion on Yahoo!, it would take 20 clicks to get the same conversion on eBay. The advertiser will either discount their bid or have two different bids depending on the source. Both outcomes are not desirable as discounting all bids will reduce the revenue, and using different bids on different sources is much harder to manage across thousands of syndication networks.

Therefore, there is a need to provide an improved solution for placing the sponsored search results to solve the above-mentioned problems.

SUMMARY

The present teaching relates to methods, systems, and programming for search results placement. In particular, the present teaching relates to methods, systems, and programming for analyzing user behavior associated with web contents.

According to an embodiment of the present teaching, a method, implemented on at least one computing device each of which has at least one processor, storage, and a communication platform connected to a network for analyzing user behavior associated with web contents includes obtaining information related to user interactions associated with a content item placed on a reference property; determining a measurement from the information associated with each user interaction of the content item; constructing an analyzing model for the content item which characterizes statistics of the measurements associated with the content item; and determining a measurement threshold to be used to determine a cost of placing the content item on a target property.

According to some embodiments, the measurement associated with each user interaction of the content item comprises time that a user spends on a web page associated with the content item.

According to some embodiments, the method may further include selecting a plurality of statistical models; generating the analyzing model by combining the plurality of statistical models; and estimating one or more parameters associated with the analyzing model.

According to some embodiments, the number of the plurality of statistical models equals to three.

According to some embodiments, the method may further include selecting a set of measurements associated with the content item whose statistics exhibit three components; computing a statistical value of a first component associated with the statistics of the set of measurements, and setting the statistical value of the first component to be the measurement threshold.

According to some embodiments, the statistical value of the first component is a mean of the first component.

According to some embodiments, the method may further include computing a median of a first component associated with the statistics of the measurements, and setting the median of the first component to be the measurement threshold.

According to some embodiments, the method may further include determining measurement thresholds for all content items placed on the reference property; and estimating a reference measurement threshold to be used to determine an average cost of placing a content item on the target property.

According to some embodiments, the reference measurement threshold is estimated using one of computing a mean of the measurement thresholds for all content items placed on the reference property to be the reference measurement threshold; and computing a median of the measurement thresholds for all content items placed on the reference property to be the reference measurement threshold.

According to some embodiments, the user interaction associated with the content item includes user clicking.

According to yet another embodiment of the present teaching, a system having at least one processor, storage, and a communication platform connected to a network for analyzing user behavior associated with web contents includes a user interactions sampler configured to obtain information related to user interactions associated with a content item placed on a reference property; a measurement extracting module configured to determine a measurement from the information associated with each user interaction of the content item; a modeling module configured to construct an analyzing model for the content item which characterizes statistics of the measurements associated with the content item; and a threshold estimator configured to determine a measurement threshold to be used to determine a cost of placing the content item on a target property.

According to some embodiments, the modeling module is further configured to select a plurality of statistical models; generate the analyzing model by combining the plurality of statistical models; and estimate one or more parameters associated with the analyzing model.

According to some embodiments, the threshold estimator is further configured to select a set of measurements associated with the content item whose statistics exhibit three components; compute a statistical value of a first component associated with the statistics of the set of measurements, and set the statistical value of the first component to be the measurement threshold.

According to some embodiments, the threshold estimator is further configured to select a set of measurements associated with the content item whose statistics exhibit three components; compute a median of a first component of the statistics of the set of measurements, and set the median of the first component to be the measurement threshold.

According to some embodiments, the threshold estimator is further configured to determine measurement thresholds for all content items placed on the reference property; and estimate a reference measurement threshold to be used to determine an average cost of placing a content item on the target property.

According to some embodiments, the reference measurement threshold is estimated using one of computing a mean of the measurement thresholds for all advertisements placed on the reference property; and computing a median of the measurement thresholds for all advertisements placed on the reference property.

According to yet another embodiment of the present teaching, a non-transitory machine-readable medium having information recorded thereon for analyzing user behavior associated with web contents, wherein the information, when read by the machine, causes the machine to perform obtaining information related to user interactions associated with content item placed on a reference property; determining a measurement from the information associated with each user interaction of the content item; constructing an analyzing model for the content item which characterizes statistics of the measurements associated with the content item; and determining a measurement threshold to be used to determine a cost of placing the content item on a target property.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 illustrates an exemplary user interaction characteristics from sampled dataset, according to an embodiment of the present teaching;

FIG. 7B illustrates exemplary proportions of web contents whose user interaction measurements exhibit one, two and three components, according to an embodiment of the present teaching;

FIG. 12 illustrates an exemplary statistics of the first component for the user interaction measurements that exhibit three components, according to an embodiment of the present teaching;

FIG. 16 illustrates an exemplary proportions of one type of user interactions predicted using a reference measurement threshold, according to another embodiment of the present teaching;

FIG. 26 illustrates an exemplary aggregated statistics of the logarithm distribution of the user interaction measurements, according to another embodiment of the present teaching;

FIG. 27 illustrates an exemplary regression coefficients for different specifications associated with the dwell time to conversion, according to another embodiment of the present teaching;

DETAILED DESCRIPTION

Figure 1:
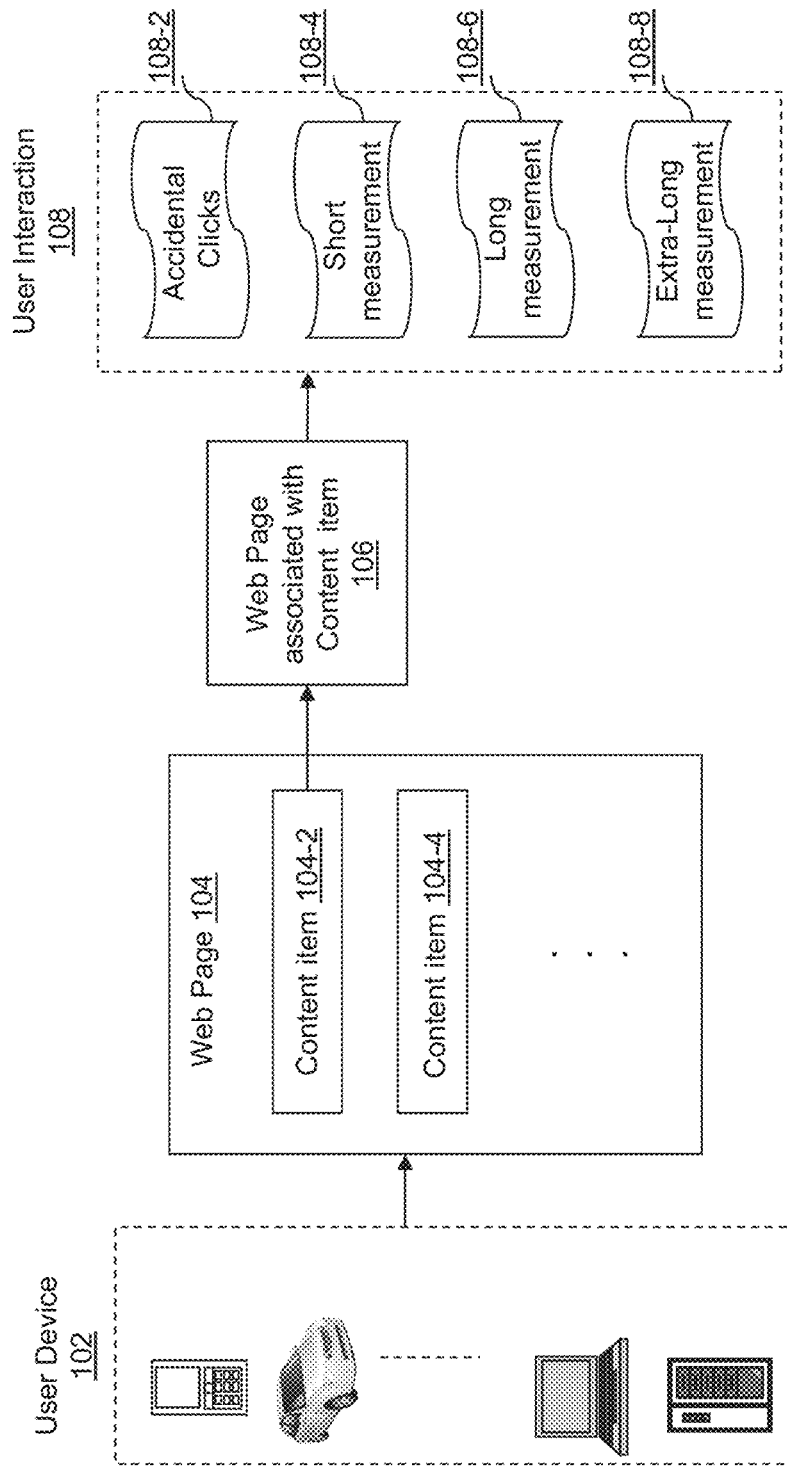
FIG. 1 illustrates an exemplary diagram for the user interactions associated with contents placed on a web page, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present teaching focuses on developing a data-driven approach to identify a measurement threshold related to accidental clicks associated with contents placed on the web site, which can in turn be used to compute discount factors for clicks. The approach is based on decomposing the distribution of dwell time (i.e., one type of measurement of user interactions after clicking a content item placed on the web page) of a large number of representative advertisements on a reference property. A property in the present teaching may be any type of web pages and applications that host various contents and/or advertisements. The property may be implemented on a desktop computer, a mobile device such as a smart phone, a tablet, a personal digital assistant (PDA), a vehicle carried device, etc. A reference property is a property that is known to be of high quality, for example the Yahoo Homerun iOS App. For each advertisement, the observed dwell times is processed to remove outliers and in some embodiments, and transformed using a non-linear logarithmic transformation. Further, the processed dwell times are decomposed into a number of prototypical components by fitting the observed data to a mixture of distributions. In some embodiments, an information criterion approach such as the Akaike (AIC) or Bayesian (BIC) information criterion is used to automatically select the number of components. Further, intermediate statistics that describe the dwell times of each component are computed, for example, the mean or median of dwell times. Finally, for computing an overall threshold for identifying accidental clicks, the intermediate statistics across all advertisements are combined to generate a reference measurement threshold, for example, by taking the mean or median of all the median dwell times.

The present teaching is made of two key contributions. First, it collects empirical dwell time observations from a reference property for a large number of advertisements. Second, for each ad, it decomposes the dwell time distribution into a mixture of components, with each component corresponding to a typical click category: (i) accidental/bouncy clicks, (ii) clicks leading to short dwell time, and (iii) clicks leading to long dwell time. Further, representative statistics for the first component of each ad are aggregated to provide an overall estimate of the threshold for accidental clicks.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 illustrates an exemplary diagram for the user interactions associated with contents placed on a web page, according to an embodiment of the present teaching. A user, via various user devices 102, can access a web page 104, view and click the content items placed on the web page, for example, 104-2, 104-4, etc., and perform further actions associated with the content items. In some embodiments, a URL (Uniform Resource Locator, previously Universal Resource Locator) is associated with a content item placed on web page 104. A user interaction with the content item, for example, a click on the content item 104-2 may re-direct the user to another web page 106 specified by the URL. The time that the user spends on the redirected web page 106 may be measured to evaluate the user interactions. In some embodiments, the measurement of the user interactions refers to as dwell time, which varies considerably by users and type of the web page. For a specific web page, the dwell time may depend on the user's state. For example, if the user accidentally clicked on a content item and landed on the web page, the user's dwell time may be very short. On the other hand, if the web page is of interest to the user, the dwell time may be much longer as the user spends more time engaging with and consuming the content. Based on the measurement of the dwell time that the user spends on a web page, the user interactions associated with the content items placed on the web page may be described in a plurality of categories, for example, (1) accidental clicks or bouncy clicks 108-2, where the user clicked on a content item on the web page but immediately closed the redirected web page and bounced back with no post-click engagement and/or questionable pre-click engagement; (2) short measurement 108-4, where the user did actually want to click on the content item and explore further information, but the user's post-click experience with further explored information did not meet his/her pre-click expectation; (3) long measurement 108-6, where the user was both pre- and post-click engaged with the content item on the web page that he/she clicked; and (4) extra-long measurement 108-8, where the user landed on a web page after clicking a content item, but became idle after a certain period of time.

Figure 2:
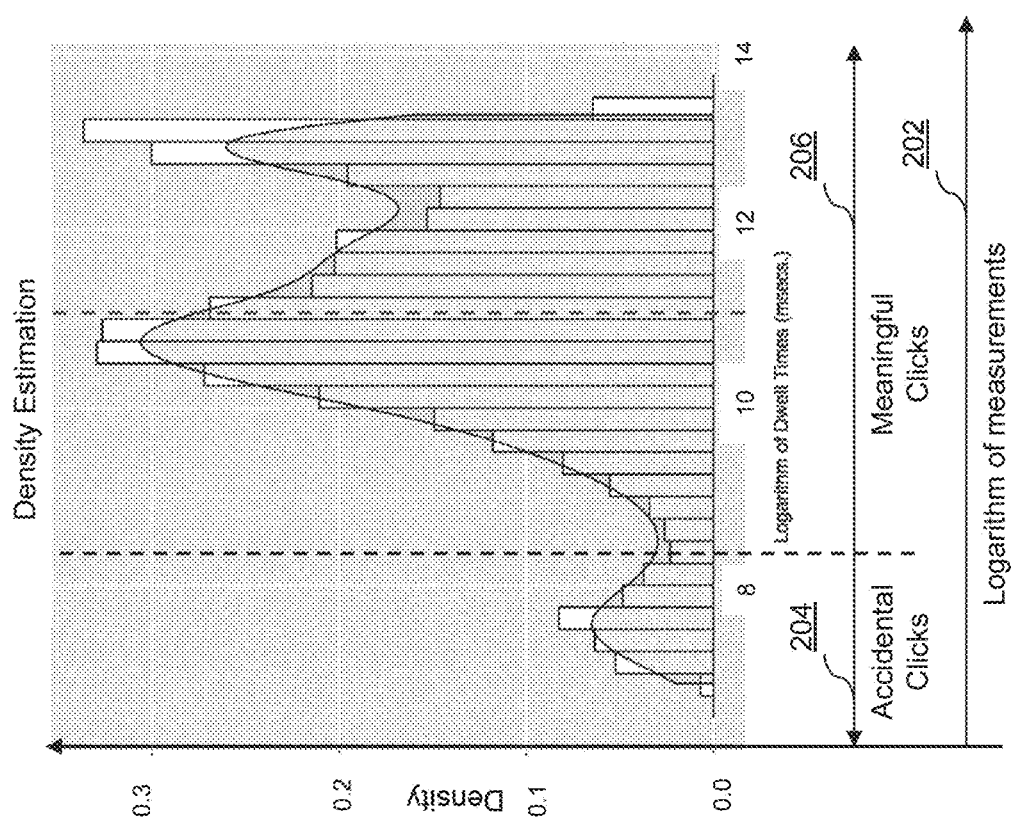
FIG. 2 illustrates an exemplary logarithm distribution for the measurements of the user interactions, according to an embodiment of the present teaching.

To better understand the user behaviors, a logarithm function is implemented on the measurements of the dwell time. FIG. 2 illustrates an exemplary logarithm distribution for the measurements of the user interactions, according to an embodiment of the present teaching. The logarithm distribution for the measurements 202 as illustrated is not unimodal; in fact, a small component may be identified for lower dwell time values (i.e., around $e^{7.5} \approx 1.81$ secs) as representative of an accidental clicks 204, whereas other two components may capture the short measurement and long measurement of the dwell time associated with the user behaviors, respectively. The short measurement and long measurement of the dwell time are meaningful clicks 206 that may further lead to commercial activities by the user. For example, if the content item is an online advertisement placed by a third-party partner or advertiser, a click on the advertisement may redirect the user to a landing page associated with the advertisement. The landing page may include some method to get into contact with the user, for example, a phone number, an email address, or an inquiry form so as to obtain a lead. If a sale is associated with the landing page, it may also include a link for the user to click to purchase, which further sends the user to a shopping cart or a checkout area.

Figure 3:
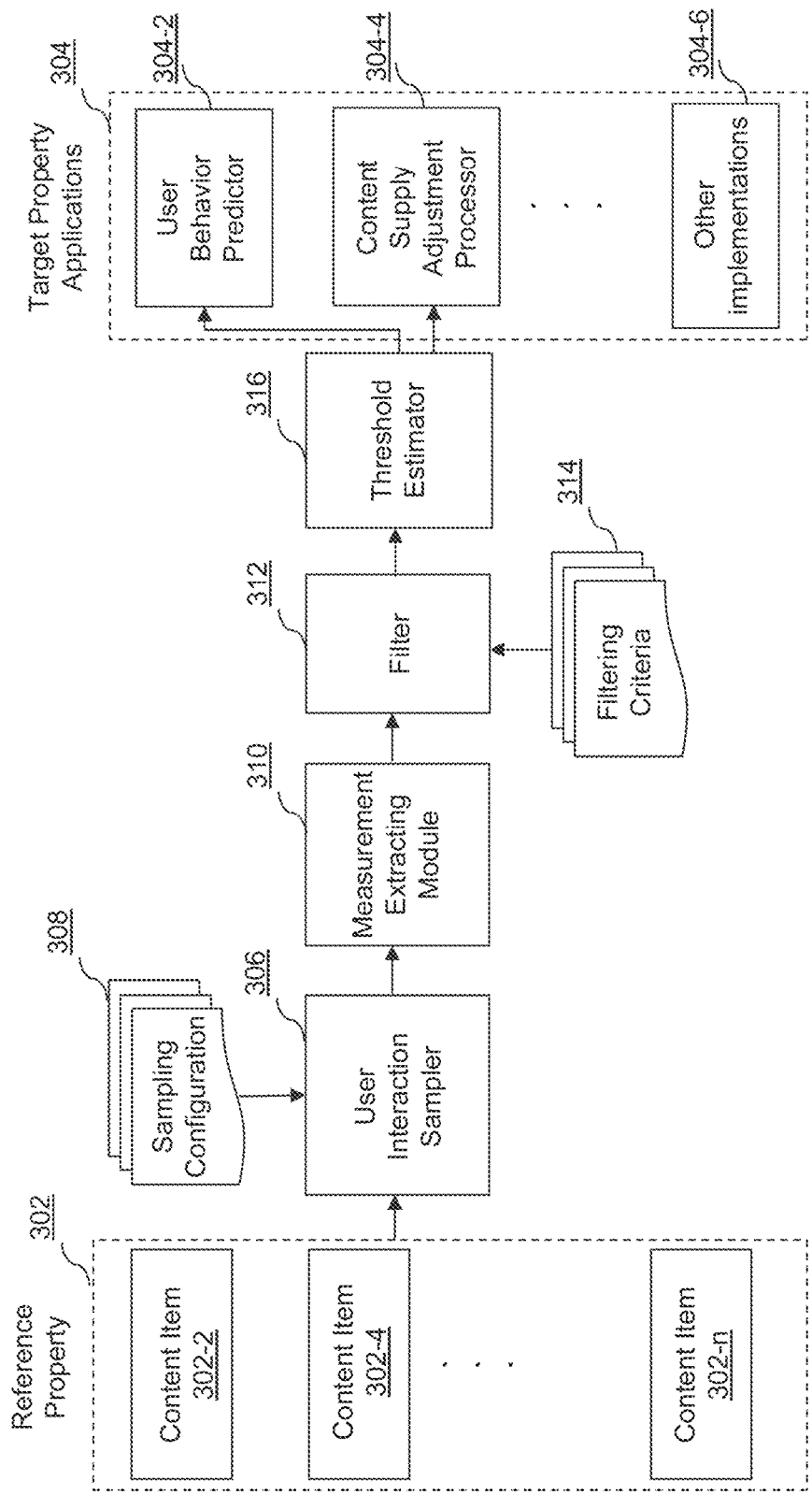
FIG. 3 illustrates an exemplary system diagram for analyzing the user interactions associated with web contents, according to an embodiment of the present teaching.

FIG. 3 illustrates an exemplary system diagram for analyzing the user interactions associated with web contents, according to an embodiment of the present teaching. The analysis of the user interactions is performed based on data related to content items placed on a reference property 302, and the result of the analysis may be applied to one or more target properties 304 for further implementations, for example, user behavior prediction 304-2, cost adjustment processing 304-4, and other implementations 304-6, etc. The reference property 302 may be a property that is known to be of stable and high quality, for example, Yahoo Homerun iOS App compatible with a mobile device, hereinafter "Homerun;" and the target property 304 may be other applications compatible with a mobile device, for example, Mail iOS App and Fantasy Sport iOS App, hereinafter "Mail" and "Fantasy Sport." The reference property 302 hosts a plurality of content items 302-2, 302-4 . . . and 302-n. The content items placed on the reference property and/or the target property may include the web page related content and the third-party advertisements. Either the web page related content or the third-party advertisements can be embedded with one or more URLs that open up other web pages upon detecting that the user clicked the content or the advertisement.

The reference property and the target property may be installed or implemented on all types of computer devices, such as desktop computer, laptop, mobile device, vehicle carried device, etc. Further, the reference property and the target property may be any applications executable by a processor and host contents on the property. In some embodiments, the reference property and the target property may be associated with a common business entity, such as Homerun, Mail and Fantasy Sport all belong to Yahoo!. In some other embodiments, the reference property and the target property may be associated with difference business entities.

The system for analyzing the user interactions associated with web contents may include a user interaction sampler 306, a measurement extracting module 310, a filter 312, and a threshold estimator 316. The user interaction sample 306 is configured to collect the data related to user interactions associated with all content items placed on the reference property, and sample the collected dataset for experiment based on the sampling configuration. In some embodiments, the dataset may be sampled in accordance with a time period, for example, the holiday seasons such as the months around Thanksgiving and Christmas. In some other embodiments, the dataset may be further sampled to use only the content items, each of which has been clicked for at least a certain numbers during a certain period of time, for example, 100 times during the holiday season. The sampling configuration may be set according to any type of analysis requirements, and is not limited to the examples set forth above. The measurement extracting module 310 is configured to extract a measurement of the user interaction from the collected dataset. In some embodiments, the measurement of the user interactions with the content item may be the dwell time that the user spends on a web page redirected from the content item. In some other embodiments, the measurement of the user interactions with the content item may be a commercial indicator related to the post-click user actions, for example, a click to conversion rate. The measurement of the user interactions with the content items placed on the web page are not limited to the examples set forth above, and may be determined in accordance with the goal of analysis requested by the web page host, i.e., a publisher, the content provider, i.e., the advertisers, third-party analyzers, etc. The filter 312 is configured to filter out any possible outlie based on filtering criteria 314 to remove all user interactions which have measurements of dwell time greater than a preset threshold, for example, 600 second. The purpose of implementing the user interaction sampler 306 and the filter 312 is to collect information that may appropriately represent the majority of user behaviors associated with the web page yet maintaining the liability of the collected information. The threshold estimator 316 is configured to generate an estimated measurement threshold for certain user interaction based on the filtered data collected from the reference property. In some embodiments, the estimated measurement threshold may refer to a dwell time threshold. A user interaction associated with a content item having a dwell time less than the threshold is identified as an accidental interaction or an accidental click. In some other embodiments, the estimated threshold may refer to a conversion rate threshold. A user interaction associated with a content item having a post-click conversion rate greater than the threshold may be identified among all types of user interactions, the most effective interaction or the most effective clicks. The user behavior predictor 304-2 may utilize such information to predict various user behavior or interactions with content items placed on the target property 304. Further, analysis of the proportions of the accidental interactions or the most effective interactions based on the reference property 302 may be used as a reference for the target property 304 to determine the cost of placing the content item on the target property 304, and whether to discount the cost or raise the cost for the content providers, as implemented in the content supply adjustment processor 304-4. The cost of placing the content item may be determined as an average cost universally applied to all content providers associated with the target property. In some embodiments, the cost may be determined as categorized costs applied to a plurality of content categories, respectively. In some other embodiments, the cost may be determined as individual cost applied to a plurality of content providers, respectively. In some embodiments, the determined cost of placing the content item in the target property refers to a price per click (PPC).

A content provider may receive a PPC discount on those identified as accidental clicks. In some other embodiments, if it is observed that content items provided by a content provider always receives a large proportion of the most effective clicks, i.e., with a high conversion rate, the target property may raise the PPC for those identified as the most effective clicks for that content provider to continue placing its content items on the target property. The application of the estimated measurement threshold may include other types of implementations 306 in accordance with different requests from the target property, the content providers, or third-party analyzer, etc., and is not limited to the examples described above.

Figure 4:
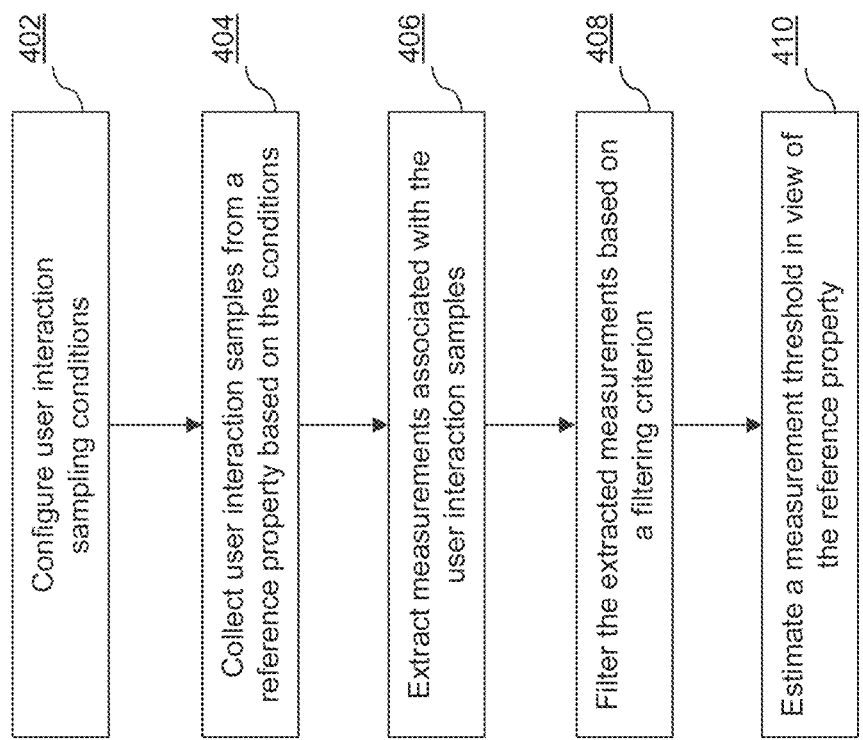
FIG. 4 illustrates an exemplary flowchart of the process for analyzing the user interactions associated with web contents, according to an embodiment of the present teaching.

FIG. 4 illustrates an exemplary flowchart of the process for analyzing the user interactions associated with web contents, according to an embodiment of the present teaching. At an initial stage 402, user interactions sampling conditions are configured in accordance with the analysis requirements. At step 404, user interaction samples are collected from a reference property based on the configured sampling conditions. At step 406, at least one type of measurement of the user interactions is extracted from the samples collected from the reference property. At step 408, the extracted measurements related to the sampled user interactions are filtered based on a filtering criterion. At step 410, a measurement threshold is estimated based on the samples user interactions collected from the reference property.

In some embodiments, the estimated measurement threshold may be provided to one or more target properties to evaluate the user behaviors associated with content items placed on the one or more target properties, and/or to determine an appropriate cost adjustment for the content providers to place the content items on the one or more target properties.

In some other embodiments, the estimated measurement threshold may be provided to the reference property to predict future user behaviors associated with the reference property, and/or to propose future cost to the content providers to continue placing the content items on the reference property.

FIG. 5 illustrates an exemplary user interaction characteristic from sampled dataset, according to an embodiment of the present teaching. User interaction data in two separate time periods associated with three properties (i.e., Homerun, Mail, and Fantasy Sport) are sampled and filtered for the purpose of analysis. For example, Homerun hosted 2,250 ads from November 2014 to December 2014. The 2,250 ads received 2.29 million clicks, among which 2.01 million clicks are used for analysis, and 12.4% of the 2.29 million clicks are filtered.

Figure 6:
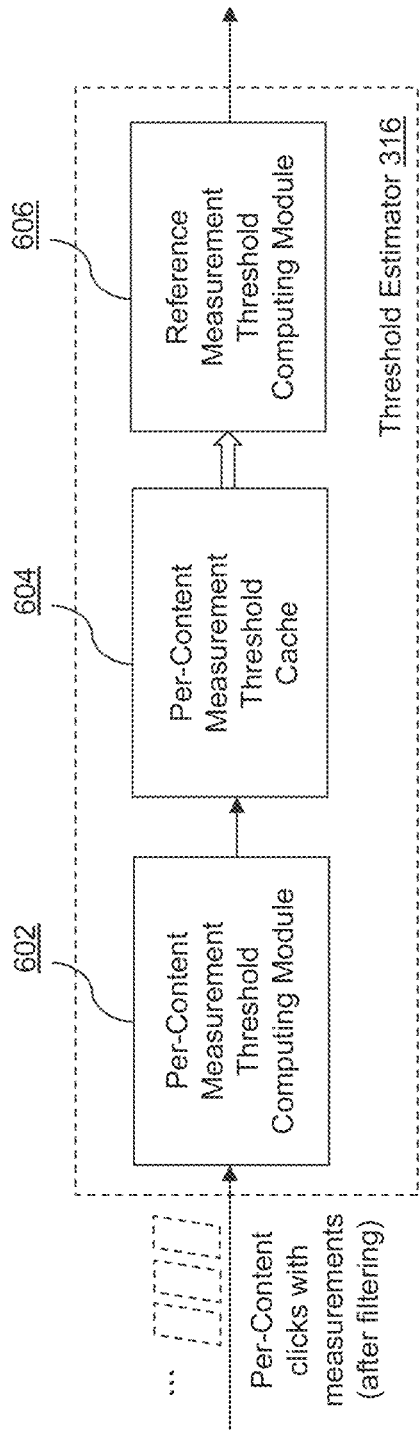
FIG. 6 illustrates an exemplary diagram of a threshold estimator for the measurement of the user interactions, according to an embodiment of the present teaching.

FIG. 6 illustrates an exemplary diagram of a threshold estimator for the measurement of the user interactions, according to an embodiment of the present teaching. A threshold estimator 316 shown in FIG. 3 may include a per-content measurement threshold computing module 602, a per-content measurement threshold cache 604, and a reference measurement threshold computing module 606. After data sampling and filtering, user interactions, i.e., clicks, with extracted measurements are sent one content item at a time to the per-content measurement threshold computing module 602 for processing. The per-content measurement threshold computing module 602 is configured to compute a measurement threshold for each content item based on the information related to the clicks on the each content item. The computed per-content measurement threshold is cached for further processing. After the measurement thresholds for all the content items placed on the reference property are computed and cached, the measurement thresholds are sent to the reference measurement threshold computing module 606 to estimate an average measurement threshold in view of the reference property.

Figure 7A:
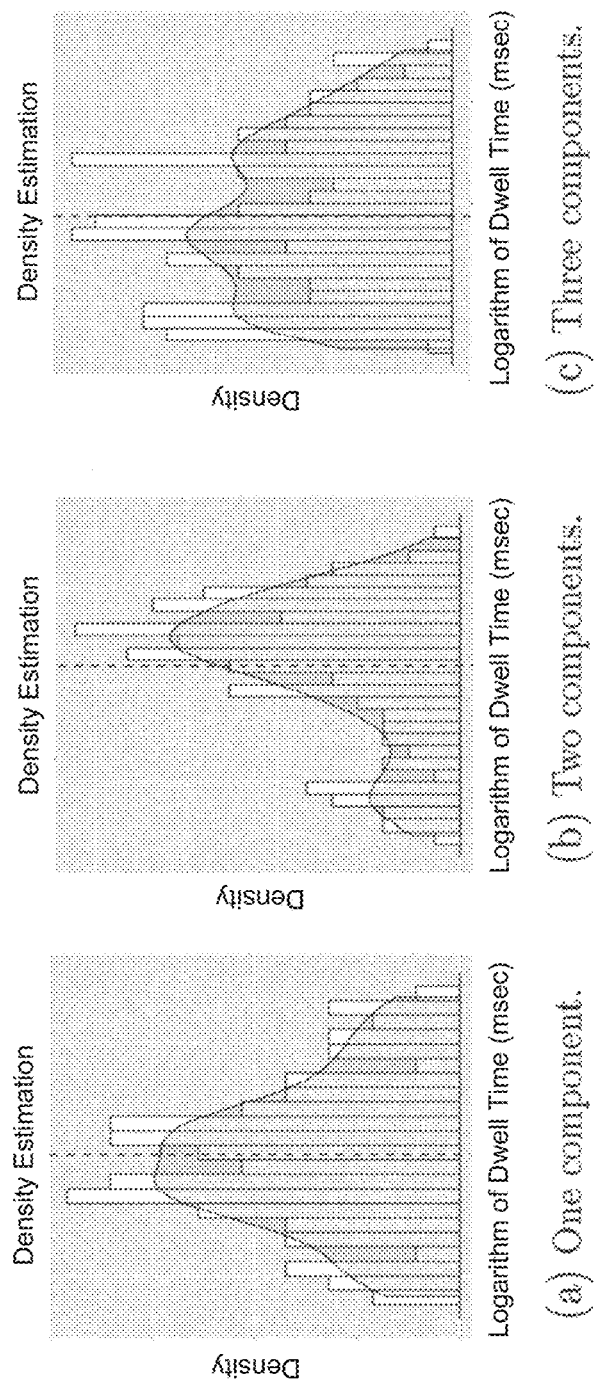
FIG. 7A illustrates exemplary web contents whose user interaction measurements exhibit one, two and three components, according to an embodiment of the present teaching.

To choose the appropriate dataset to estimate the measurement threshold, i.e., the dwell time threshold, the observed dwell time from clicks on the reference property is fitted to a mixture of one or more distributions. FIG. 7A illustrates exemplary web contents whose user interaction measurements exhibit one, two and three components, according to an embodiment of the present teaching. FIG. 7A-(a) shows that a distribution of dwell time associated with a sample content item placed on the reference property exhibits one component; FIG. 7A-(b) shows that a distribution of dwell time associated with another sample content item placed on the reference property exhibits two components (i.e., a mixture of two distributions); and FIG. 7A-(c) shows that a distribution of dwell time associated with yet another sample content item placed on the reference property exhibits three components (i.e., a mixture of three distributions).

FIG. 7B illustrates exemplary proportions of web contents whose user interaction measurements exhibit one, two and three components, according to an embodiment of the present teaching. As observed for all the content items placed on reference property Homerun, during the time period of November to December, 2014, 1% of user interactions fall into the one component category, 16.5% of user interactions fall into the two components categories, and 82.5% of user interactions fall into the three components category. Meantime, 65.4% of user interactions from January to February, 2015 fall into the three components category. As three components may have captured the user behavior characteristics including accidental clicks, short dwell time, and long dwell time, those user interactions whose dwell time exhibit three components are selected for further analysis.

Figure 8:
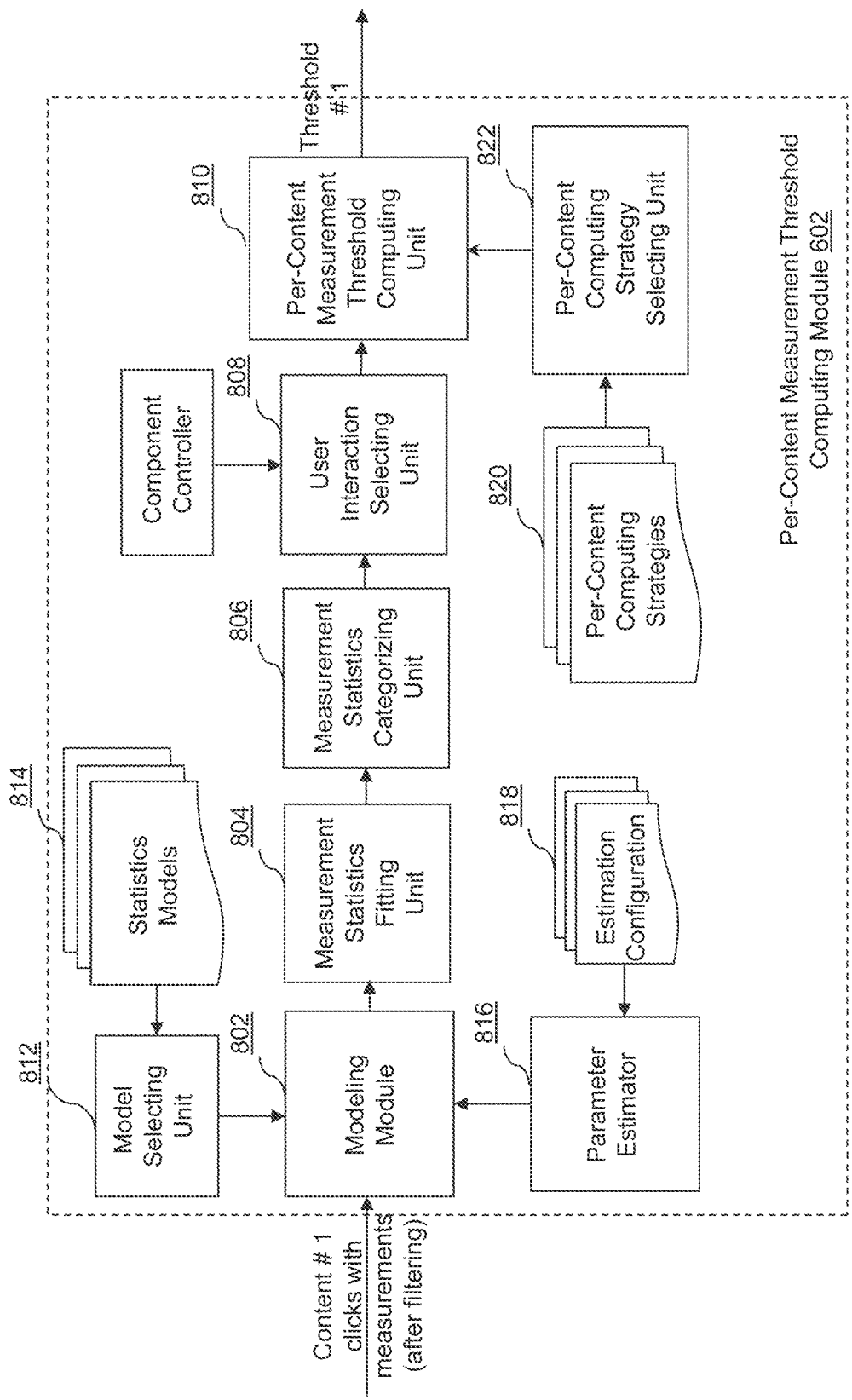
FIG. 8 illustrates an exemplary system diagram of a per-content item measurement threshold computing module, according to an embodiment of the present teaching.

FIG. 8 illustrates an exemplary system diagram of a per-content item measurement threshold computing module, according to an embodiment of the present teaching. The per-content measurement threshold computing module 602 shown in FIG. 6 may include a modeling module 802, a measurement statistics fitting module unit 804, a measurement statistics categorizing unit 806, a user interaction selecting unit 808, and a per-content measurement threshold computing unit 810. Measurements of user interactions associated with a content item are transmitted to the modeling module 802, and further are fitted into a constructed analyzing model in the measurement statistics fitting unit 804. The measurement statistics categorizing unit 806 is configured to determine how many distribution components that the fitted measurements related to the content item exhibit, and categorize the measurements related to the content item to a defined category based on the number of distribution components being observed. The user interaction selecting unit 808 is configured to receive the categorized measurements, and select only those measurements in accordance with the instruction sent from a component controller 824. In some embodiments, the component controller 824 may instruct the user interaction selecting unit 808 to select only the measurements exhibiting three components; however, the component controller 824 may define any numbers of components as a reference to select the measurements for analysis. The selected measurements are sent to the per-content measurement threshold computing unit 810 to compute a measurement threshold related to the content item.

In some embodiments, the per-content measurement threshold computing module 602 may further include a model selecting unit 812 and a parameter estimator 816. The model selecting module 602 is configured to select one or more appropriate models from a plurality of statistics models 814 to construct an analyzing model in accordance with the purpose of analysis. The parameter estimator 816 is configured to estimate for every content item, a vector of parameters of all components observed in the measurements.

I. Fitting the Measurements to a Mixture of Distributions

A mixture of distributions in general is a probabilistic model which captures the presence of "sub-populations" within an overall population. More formally, a continuous random variable X (e.g., dwell time) is distributed according to a mixture of K (discrete) component distributions if its probability density function (pdf) $f_X$ is a convex combination of K pdfs $f_1, \ldots, f_K$, as follows:

$$f_X(x;\theta) = \omega_1 f_1(x;\theta_1) + \ldots + \omega_K f_K(x;\theta_K) = \Sigma_{i=1}^{K} \omega_i f_i(x;\theta_i) \quad (1)$$

where:
each $f_i$ belongs to the same (parametric) family of distributions (e.g., Normal/Gaussian, LogNormal, Gamma, Weibull, etc.);
$\omega_i$ is the mixture weight (or prior probability) associated with the i-th component;
$\omega_i \geq 0$ and $\omega = (\omega_1, \ldots, \omega_K)^T$ is the K-dimensional vector of mixture weights, so that $\Sigma_{i=1}^{K} \omega_i = 1$;
$\theta_i$ is the vector of parameters associated with the i-th component, e.g., if $f_i$ is the pdf of a Normal distribution $\mathcal{N}(\mu_i, \sigma_i^2)$ then $\theta_i = (\mu_i, \sigma_i^2)$;
$\theta = (\omega_1, \ldots, \omega_K, \theta_1, \ldots, \theta_K)$ is the overall vector of parameters of the mixture model;
there exists a latent random variable denoted by ind which governs which component each observation of X is drawn from. This random variable is distributed according to a categorical distribution whose parameter is the vector of mixture weights co, so that:
1. ind~Categorical($\omega$) ↦ pick the component distribution $f_i$ with probability $\omega_i$;
2. X=x'|ind=i ↦ =generate a value for X from the component distribution $f_i$.

Depending on the family of distributions which $f_i$ belongs to, this can be done using the inverse transform sampling technique, which involves computing the inverse of the cumulative distribution function (also known as quantile function). For some family of parametric distribution (e.g., Uniform, Exponential, Weibull, etc.), there exists a closed-form expression of the corresponding quantile function therefore the technique can be easily applied as follows.

Let $F_i(x) = \int_{-\infty}^{x} f_i(x; \theta_i) dx$ be the cumulative distribution function for the inverse transform sampling requires to uniformly select a number $u \in [0,1]$ and return the value X=x' so that $x' = F_i^{-1}(u) = \inf \{x | F_i(x) \geq u\}$. For other family of distributions (e.g. Normal) which do not have a closed-form expression of the quantile function, other sampling techniques requiring numerical approximation may apply.

II. Mixture of Distributions for Measurements, i.e., Dwell Time

In some embodiments, M is the number of content items being observed and, for each content item $j \in \{1, \ldots, M\}$, a sample of $n_j$ i.i.d. random variables $X_{j,1}, \ldots, X_{j,nj}$ with each $X_{j,k}$ representing an observation of the dwell time associated with the k-th click on the content item j is considered. Assuming each $X_{j,k}$ is drawn from a mixture of up to K=3 components, the pdf of $X_{j,k}$ is:

$$f_{X_{j,k}}(x;\theta) = \Sigma_{i=1}^{3} \omega_i f_i(x;\theta_1) \quad (2)$$

It is also assumed that each $f_i$ is the pdf of the same parametric distribution described by two parameters (e.g., Normal/Gaussian, LogNormal, Gamma, Weibull, etc.). Each vector of parameters $\theta_i$ is hence a 2-dimensional vector where $\theta_i=(\theta_{i,1}, \theta_{i,2})$.

III. Parameter Estimation and Model Selection

In some embodiments, the parameter estimator 816 is configured to use Maximum Likelihood Estimation (MLE). It is well known that given the same data, the more complex/flexible the model is, the better its goodness-of-fit to the data will be, e.g., the higher its likelihood as computed with respect to the dataset will be. Further, the more complex/flexible the model is, the less it generalizes to unseen data (i.e., the higher the chance of the model to over fit the data is). For example, if the model is only selected to have the highest likelihood, it may end up selecting the one having the maximum degree of freedom (i.e., the maximum number of components K=3). Therefore, in some embodiments, to avoid over fitting and find a trade-off between complexity and interpretability, a tool such as the Akaike Information Criterion (AIC) is implemented, which is computed as AIC=2K−2 ln(L), where K is the number of components of the model, and L is the likelihood function as maximized by the parameters of the model estimated from the observed data. The analyzing model is constructed by selecting the one with the smallest AIC.

IV. Estimating a Measurement Threshold for the Accidental Clicks

In some embodiments, the per-content measurement threshold computing module 602 may further include a per-content computing strategy selecting unit 822, which is configured to select a pre-content computing strategy from a plurality of pre-content computing strategies 820, and send the selected computing strategy to the per-content measurement threshold computing unit 810. Intuitively, those selected measurements of user interactions show three categories of clicks: accidental/bouncy, short and long. Given a content item and the set of vectors of parameters of all its components, statistics such as the expected value or the median of every component can be easily computed. In some embodiments, to analyze the accidental/bouncy clicks, statistics of the first component of each measurement distribution is computed to generate the per-content measurement threshold. For example, if the measurements are fitted to a mixture of Lognormal distributions $Z \sim \ln \mathcal{N}(\mu, \sigma^2)$, or equivalently $\ln(Z) \sim \mathcal{N}(\mu, \sigma^2)$, statistics of the first component of the mixture of Lognormal distributions can be computed as:

$$E[Z]=e^{\mu+\sigma^2/2} \quad (3)$$

$$\text{Median}(Z)=e^{\mu} \quad (4)$$

It will be appreciated that the mixture of distributions for analyzing the dwell time may be a non-parametric model in some embodiments. The non-parametric model makes no assumptions about the probability distributions of the variables being assessed, and grows the number of parameters with the amount of training data. As measurements other than dwell time may be adopted to evaluate user behaviors, non-parametric model provides flexibility and robustness to fit the observed measurements to an appropriate analyzing model.

Figure 9:
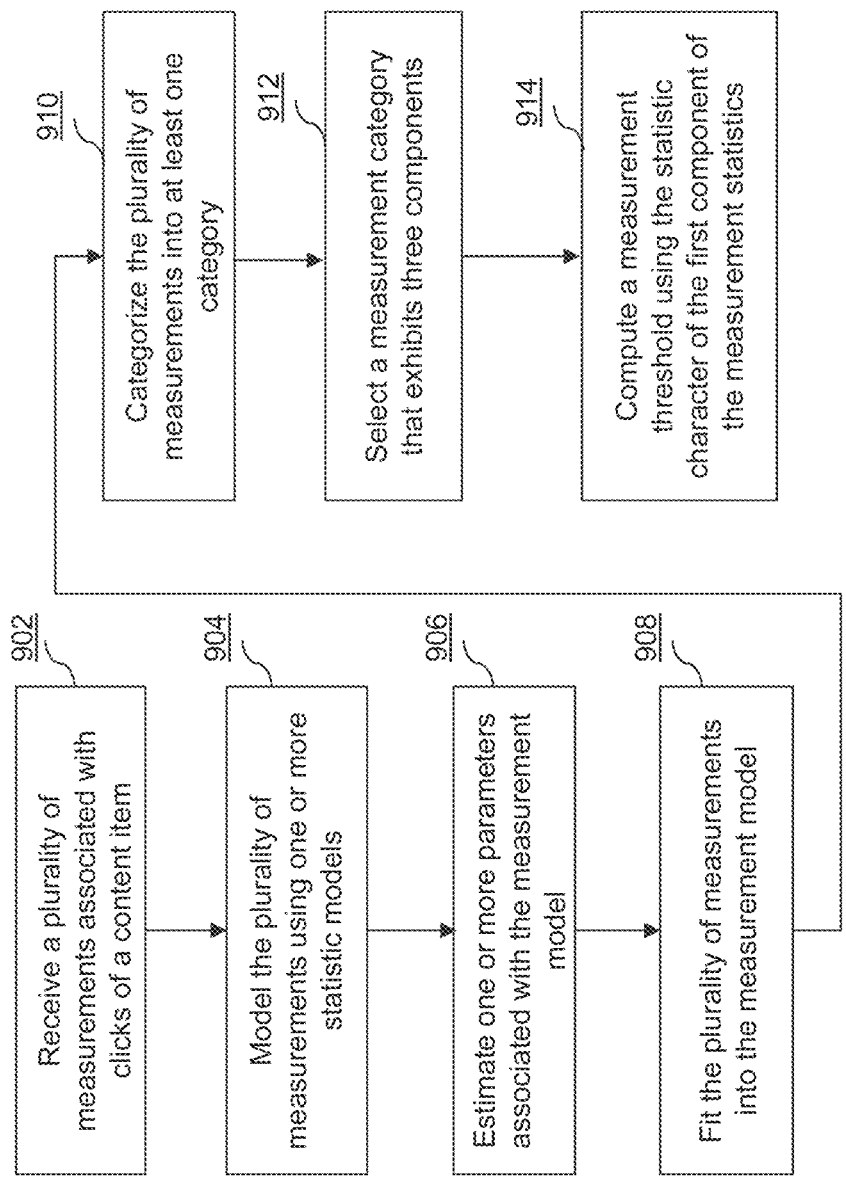
FIG. 9 illustrates an exemplary flowchart of the process for computing a per-content item measurement threshold, according to an embodiment of the present teaching.

FIG. 9 illustrates an exemplary flowchart of the process for computing a per-content item measurement threshold, according to an embodiment of the present teaching. The process for computing a per-content item measurement threshold may include step 902 for receiving a plurality of measurement associated with clicks of a content item, step 904 for modeling the plurality of measurements using one or more statistic models, step 906 for estimating one or more parameters associated with the measurement model, step 908 for fitting the plurality of measurements into the measurement model, step 910 for categorizing the plurality of measurements into at least one category, step 912 for selecting a measurement category that exhibits three components, and step 914 for computing a measurement threshold using the statistic character of the first component of the measurement statistics.

Figure 10:
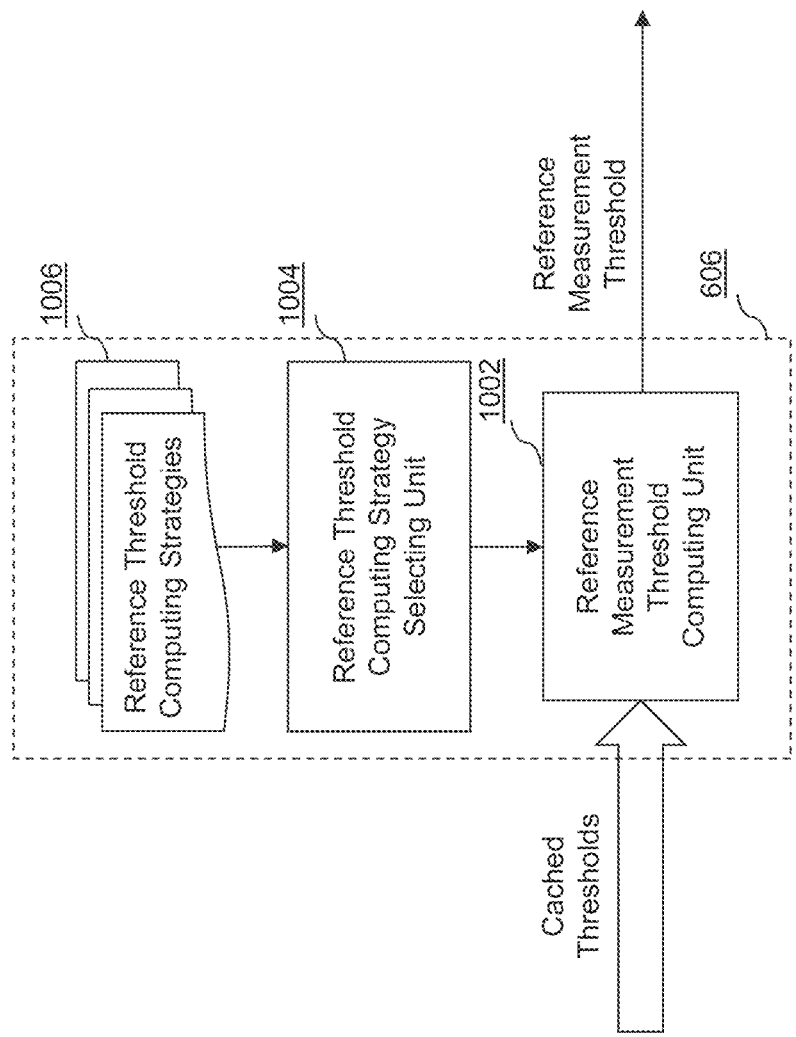
FIG. 10 illustrates an exemplary system diagram of a reference measurement threshold computing module, according to an embodiment of the present teaching.

FIG. 10 illustrates an exemplary system diagram of a reference measurement threshold computing module, according to an embodiment of the present teaching. The reference threshold computing model 606 shown in FIG. 6 may include a reference threshold computing unit 1002 and a reference threshold computing strategy selecting unit 1004. The reference measurement threshold computing unit 1002 is configured to receive cached thresholds estimated for all content items placed on the reference property, and compute an average threshold, i.e., the reference measurement threshold using a computing strategy selected from a plurality of reference threshold computing strategies 1006 by the reference threshold computing strategy selecting unit 1004. The strategies for computing the reference threshold may be selected to be the same as computing individual threshold for each content item. For example, the individual threshold for each content item is computed using the median, and the average threshold is computed by aggregating the per-content threshold using the median. In some other embodiments, the strategies for computing the reference threshold may be selected to be different from computing individual threshold for each content item. The measurement threshold computing strategies may include other statistics value associated with the distribution, and are not limited to the examples set forth above.

Figure 11:
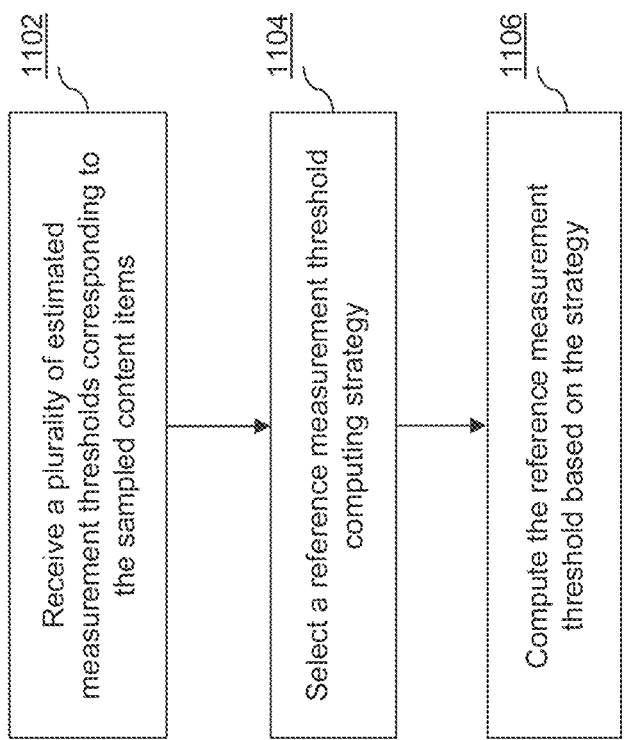
FIG. 11 illustrates an exemplary flowchart of the process for computing a reference measurement threshold, according to an embodiment of the present teaching.

FIG. 11 illustrates an exemplary flowchart of the process for computing a reference measurement threshold, according to an embodiment of the present teaching. The process for computing a reference measurement threshold includes step 1102 for receiving a plurality of estimated measurement thresholds corresponding to the sampled content items, step 1104 for selecting a reference measurement threshold computing strategy, and step 1106 for computing the reference measurement threshold based on the selected strategy.

FIG. 12 illustrates an exemplary statistics of the first component for the user interaction measurements that exhibit three components, according to an embodiment of the present teaching. For each content item, the estimate of the threshold may use either the expected value or the median of its fitted first component. In some embodiments, the median of the first distribution is selected as the computing strategy as it is more robust to the variance. Further, to generate an average estimate of the threshold (i.e., an estimate derived from the all per-content estimates), either of two strategies may be adopted as:

the mean of all the per-content medians;

the median of all the per-content medians.

FIG. 12 summarizes the measurement threshold estimated for the sampled Homerun dataset in two separate time periods. From November to December, 2014, the dwell time threshold is estimated to be 2.244 seconds if the computing strategy is selected as median, and 4.970 seconds if the computing strategy is selected as mean. It is observed that the estimated thresholds for the November-December '14 and January-February '15 time periods are consistent and comparable.

Figure 13:
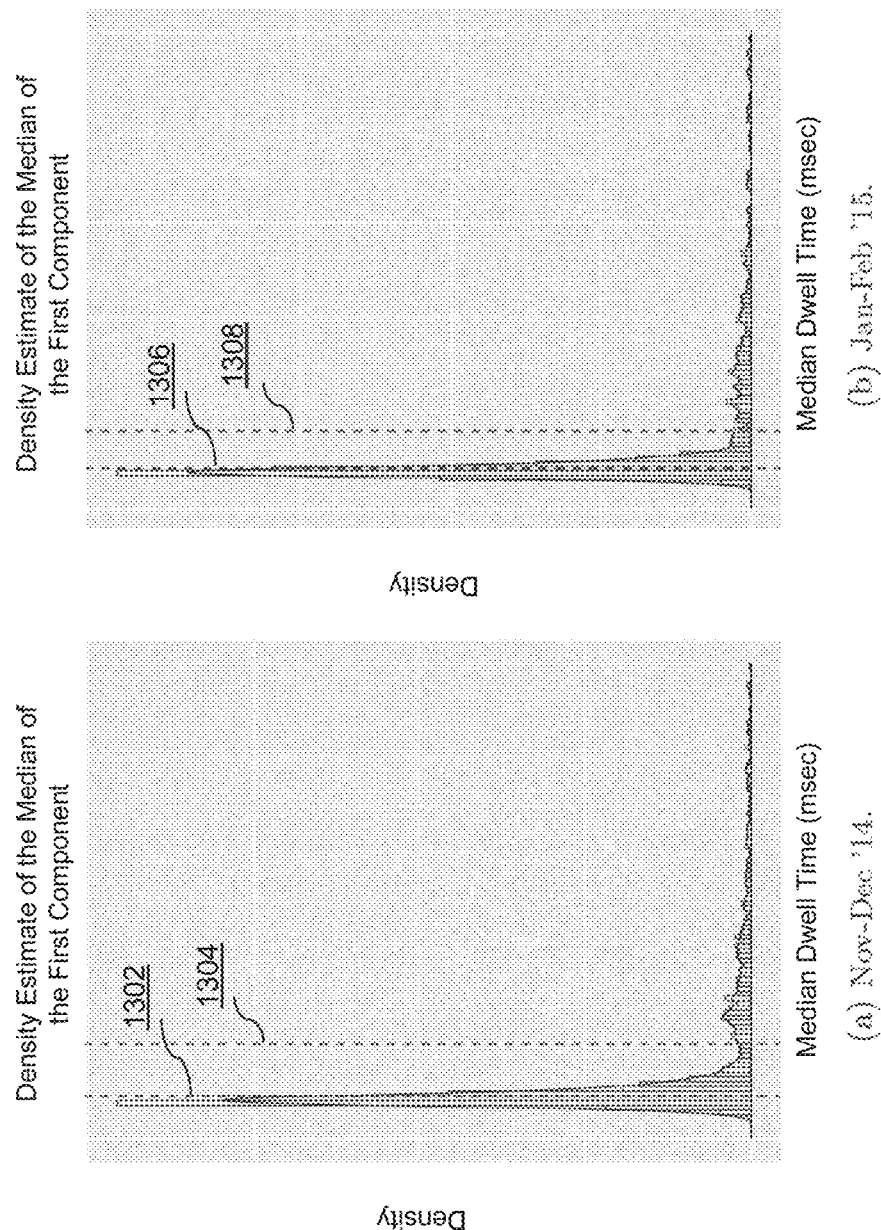
FIG. 13 illustrates an exemplary distribution of the per-content user interaction measurements, according to an embodiment of the present teaching.

FIG. 13 illustrates an exemplary distribution of the per-ad user interaction measurements, according to an embodiment of the present teaching. The mean of all the per-content medians estimation is considered more aggressive as it results in a generally higher threshold, which implies a larger number of accidental clicks. On the other hand, the median of all the per-content medians estimation is considered more conservative and it usually provides a smaller value for the threshold. As shown in FIG. 13, the dwell time threshold 1302 computed using the median of all the per-content medians is lower than the dwell time threshold 1304 computed using the mean of all the per-content medians during November-December '14 time period; and the dwell time threshold 1306 computed using the median of all the per-content medians is lower than the dwell time threshold 1308 computed using the mean of all the per-content medians during January-February '15 time period. However, it is observed that the estimated dwell time threshold using the median of all the per-content medians (i.e., 1302 or 1306) is more suitable than the one using the mean of all the per-content medians, as threshold 1302 or 1306 matches the peak of the density estimation of the first component that represents accidental clicks.

Figure 14:
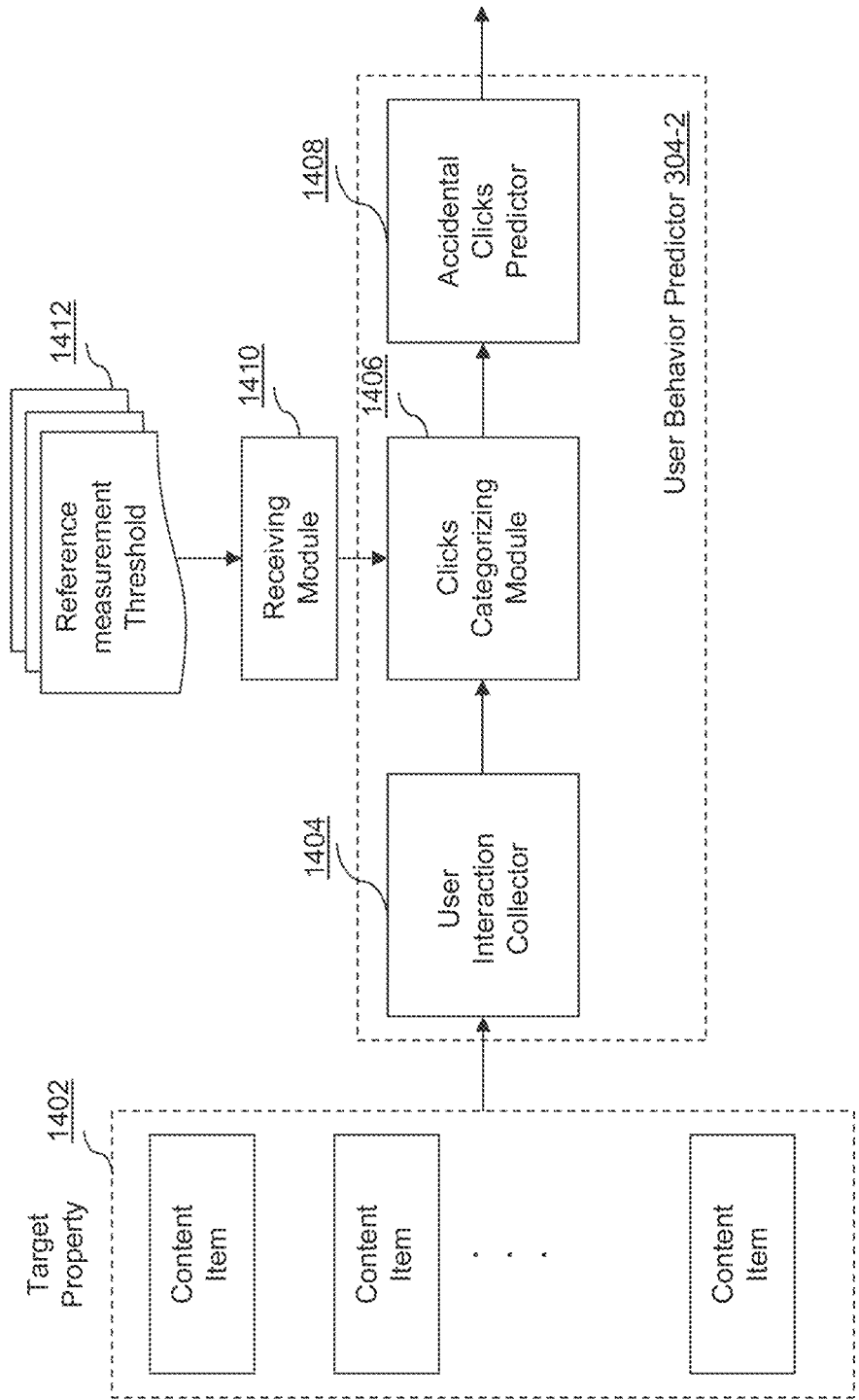
FIG. 14 illustrates an exemplary system diagram of a user interaction predictor associated with contents placed on a target property, according to another embodiment of the present teaching.

FIG. 14 illustrates an exemplary system diagram of a user interaction predictor associated with contents placed on a target property, according to another embodiment of the present teaching. In this embodiment, the reference measurement threshold estimated based on data collected from the reference property is applied to target property 1402 for predicting user behaviors associated with a plurality of content items (i.e., 1402-2, 1402-4, . . . 1402-n) placed on the target property. The user behavior predictor 304-2 shown in FIG. 3 may include a user interaction collector 1404, a clicks categorizing module 1406, and an accidental clicks predictor 1408. The user interaction collector 1404 is configured to collect information related to clicks on the plurality of content items placed on the target property 1402. The clicks categorizing module 1406 is configured to categorize the collected information related to clicks based on the reference measurement threshold 1412 received via a receiving module 1410. The accidental clicks predictor 1408 is configured to predict a proportion of accidental clicks on the content items based on the categorized information. In some embodiments, the user interaction collector 1404 is further configured to sample and filter the collect information for the purpose of analysis and the reliability of the information. The data sampling and filtering are detailed foregoing, and thus, are not repeated herein.

Figure 15:
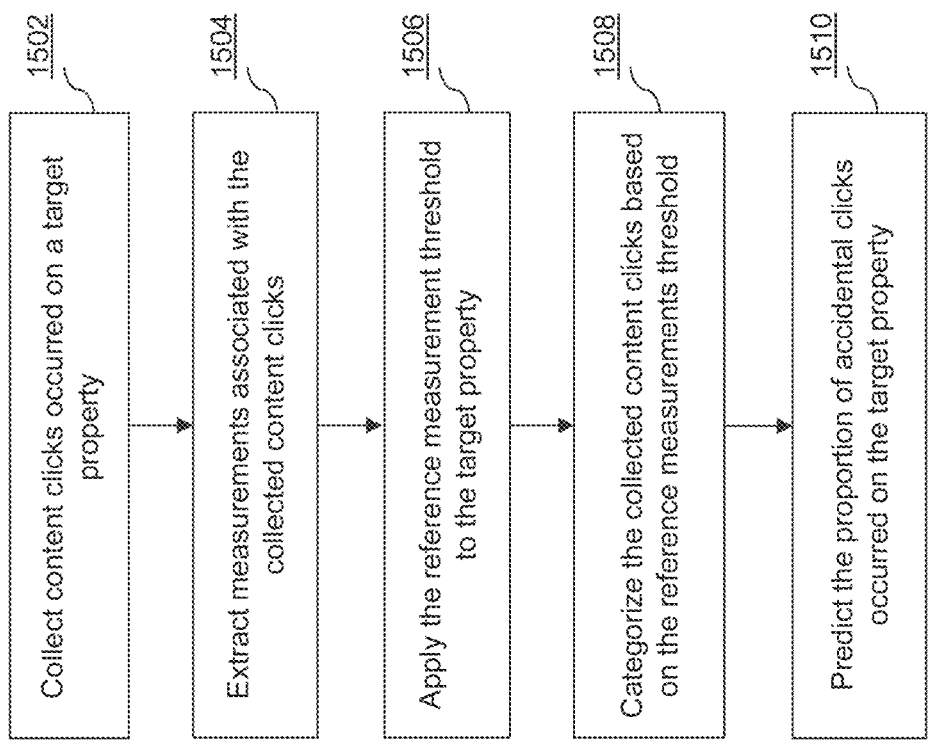
FIG. 15 illustrates an exemplary flowchart of the process for predicting the user interactions associated with a target property, according to another embodiment of the present teaching.

FIG. 15 illustrates an exemplary flowchart of the process for predicting the user interactions associated with a target property, according to another embodiment of the present teaching. The process for predicting the user interactions associated with a target property may include step 1502 for collecting content clicks occurred on a target property, step 1504 for extracting measurements associated with the collected content clicks, step 1506 for applying the reference measurement threshold to the target property, step 1508 for categorizing the collected content clicks based on the reference measurements threshold, and step 1510 for predicting the proportion of accidental clicks occurred on the target property.

FIG. 16 illustrates an exemplary proportions of one type of user interactions predicted using a reference measurement threshold, according to another embodiment of the present teaching. During the time period of November-December '14, using the mean of all the per-content medians, Homerun has 13.5% accidental clicks, Mail has 62.7% accidental clicks, and Fantasy Sport has 64.2% accident clicks; while using the median of all the per-content medians, Homerun has 7.8% accidental clicks, Mail has 42.6% accidental clicks, and Fantasy Sport has 41.8% accident clicks. A target property such as Mail or Fantasy Sport, may use the above estimated results to discount the PPC cost that the providers pay for their contents placed on the target property. Using the results from the mean of all the per-content medians estimation to discount the PPC cost for content providers may be more aggressive as the target property will be giving a greater discount, which leads to revenue loss for the target property. On the contrary, using the results from the median of all the per-content medians estimation to discount the PPC cost for content providers may be too conservative as the content providers receive lower discount on the PPC cost, and as a result, the content providers may look for other properties to place their contents. In some circumstances, the target property may consider both estimated thresholds and determine an appropriate PPC cost discount ratio that is acceptable to both the content providers and the target property.

Figure 17:
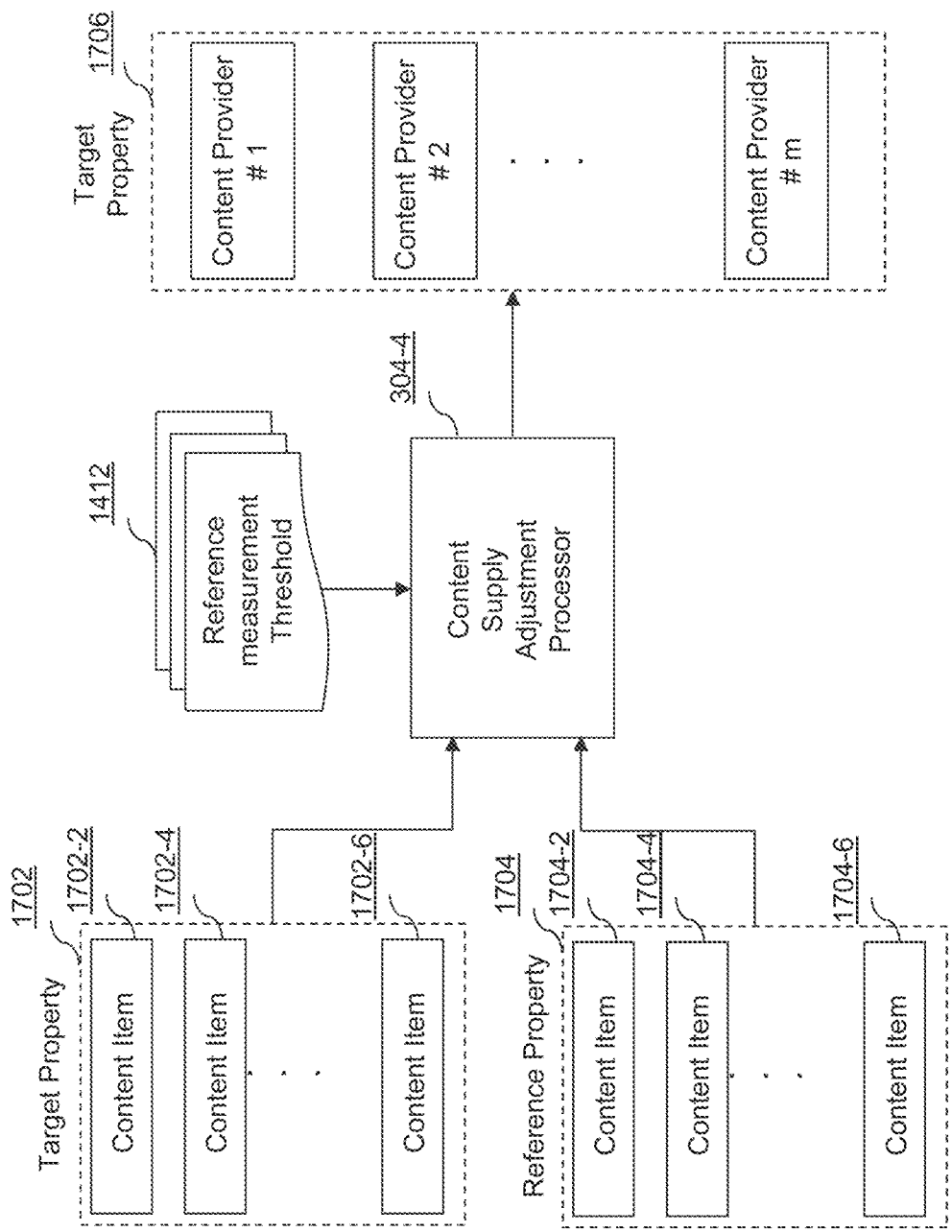
FIG. 17 illustrates an exemplary system diagram for providing content supply adjustment for providers associated with a target property, according to another embodiment of the present teaching.

FIG. 17 illustrates an exemplary system diagram for providing content supply adjustment for providers associated with a target property, according to another embodiment of the present teaching. The illustrated embodiment evaluates the user interactions associated with content items placed on both a reference property 1704 and a target property 1702 by implementing the estimated reference measurement threshold 1412, and provide content supply adjustment for the content providers. The content supply adjustment processor 304-4 shown in FIG. 3 is configured to collect datasets from the target property 1702 and the reference property 1704, and determine a cost adjustment of placing the content items on the target property based on the collected dataset and the reference measurement threshold 1412. The content supply adjustment processor 304-4 may further provide the cost adjustment to a plurality of content providers 1706.

Figure 18:
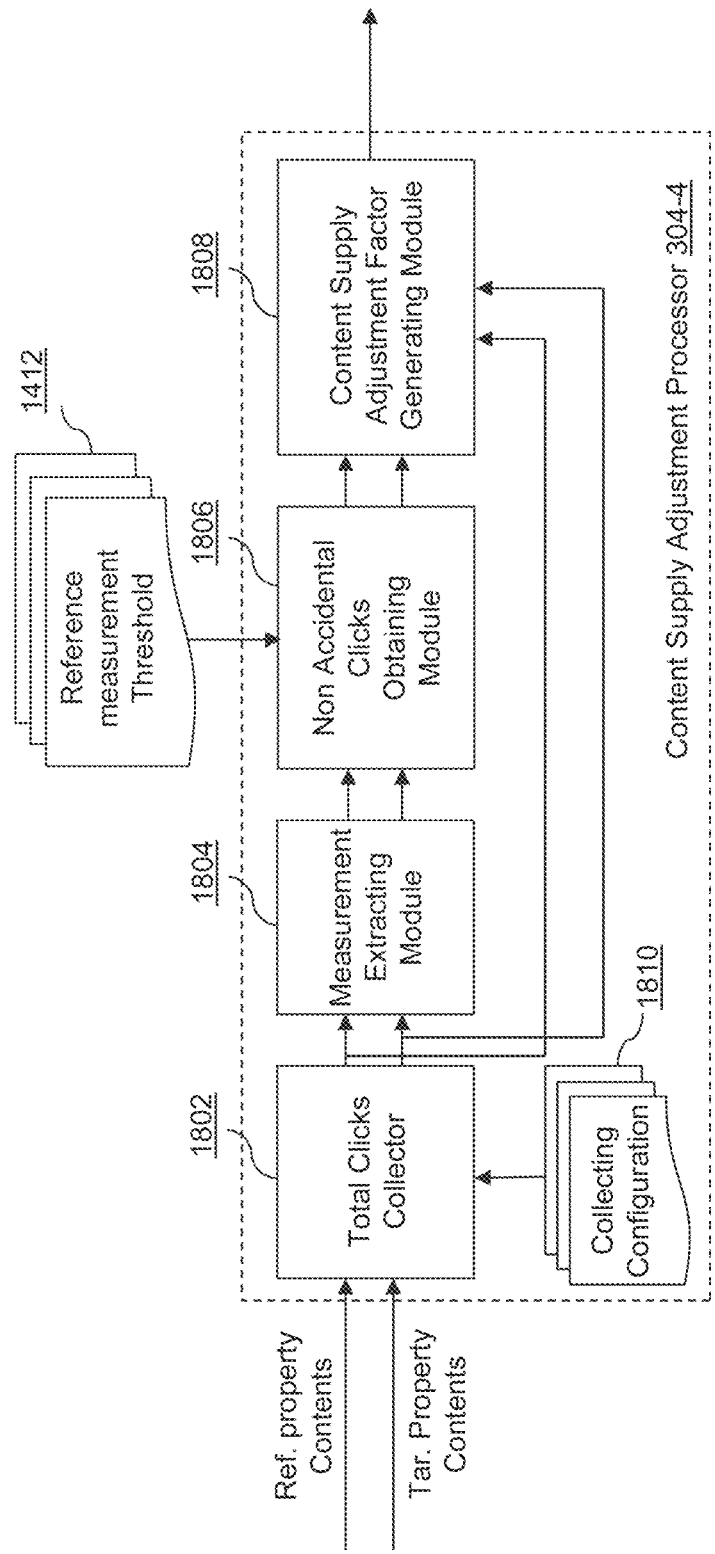
FIG. 18 illustrates an exemplary system diagram of a content supply adjustment processor, according to another embodiment of the present teaching.

FIG. 18 illustrates an exemplary system diagram of a content supply adjustment processor, according to another embodiment of the present teaching. The content supply adjustment processor 304-4 shown in FIG. 3 includes a total clicks collector 1802, a measurement extracting module 1804, a non-accidental clicks obtaining module 1806, and a content supply adjustment factor generating module 1808. The total clicks collector 1802 is configured to collect information related to user interactions associated with content items placed both on a reference property and a target property based on preset collecting configuration 1810. In some embodiments, the collecting configuration 1810 may include sampling and filtering in accordance with a preset requirement. The measurement extracting module 1804 is configured to retrieve measurements related to the user interaction information for both the reference property and the target property. In some embodiments, the measurement related to the user interaction information is the dwell time that a user spends on a web page redirected from the user interaction with a content item. The non-accidental clicks obtaining module 1806 is configured to obtain a set of non-accidental clicks for both the reference property and the target property using the pre-estimated reference measurement threshold 1412. The collected total clicks and the sets of non-accidental clicks for both the reference property and the target property are further sent to the content supply adjustment factor generating module 1808 to compute an average adjustment factor for placing the content items in the target property.

Figure 19:
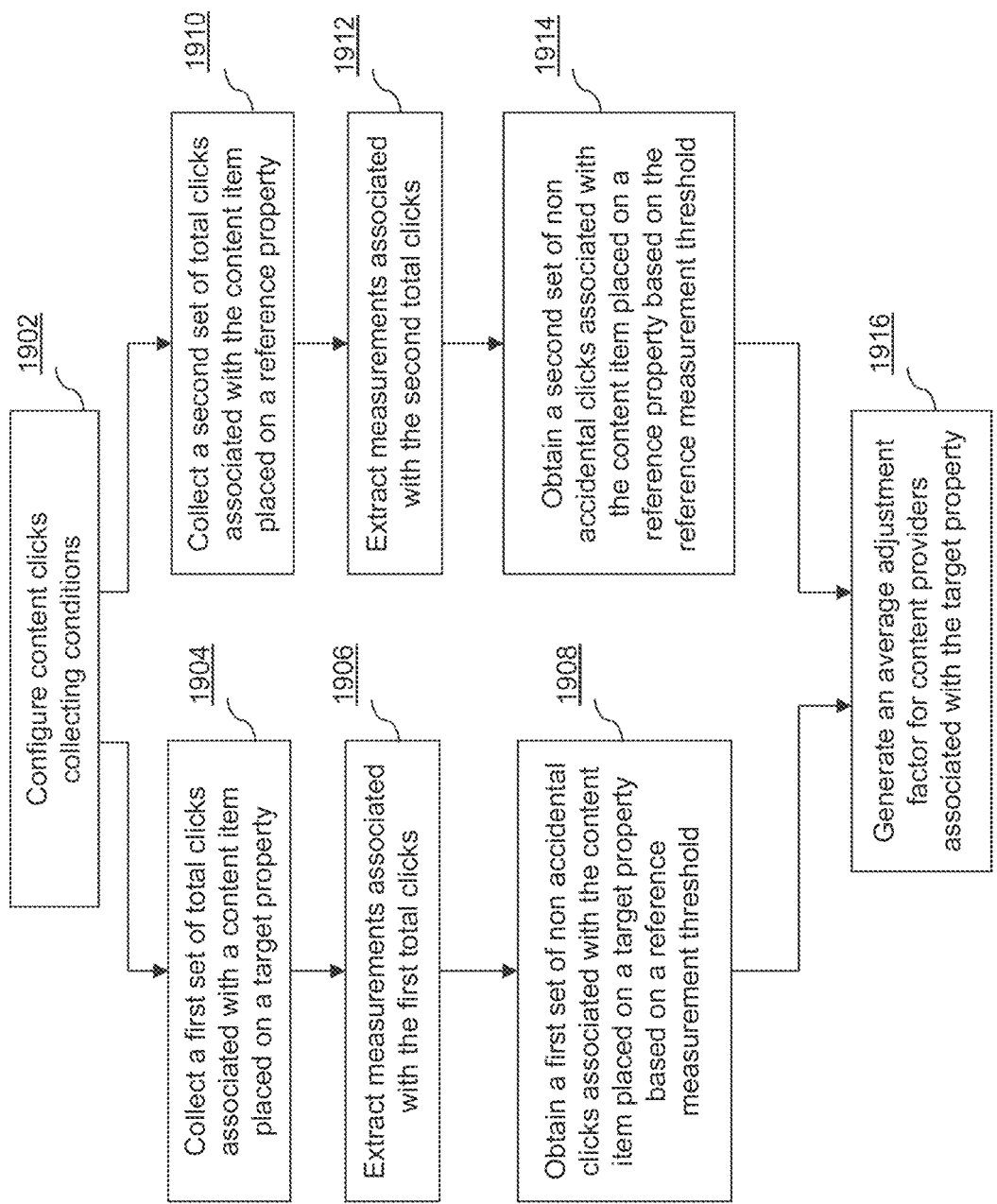
FIG. 19 illustrates an exemplary flowchart of the process for generating an average adjustment factor for content providers associated with a target property, according to another embodiment of the present teaching.

FIG. 19 illustrates an exemplary flowchart of the process for generating an average adjustment factor for content providers associated with a target property, according to another embodiment of the present teaching. The process for generating an average adjustment factor for content providers associated with a target property may include step 1902 for configuring content clicks collecting conditions, step 1904 for collecting a first set of total clicks associated with a content item placed on a target property, step 1906 for extracting measurements associated with the first set of total clicks, step 1908 for obtaining a first set of non-accidental clicks associated with the content item placed on the target property based on a reference measurement threshold, step 1910 for collecting a second set of total clicks associated with a content item placed on a reference property, step 1912 for extracting measurements associated with the second set of total clicks, step 1914 for obtaining a second set of non-accidental clicks associated with the content item placed on the reference property based on a reference measurement threshold, and step 1916 for generating an average adjustment factor for content providers associated with the target property.

Figure 20:
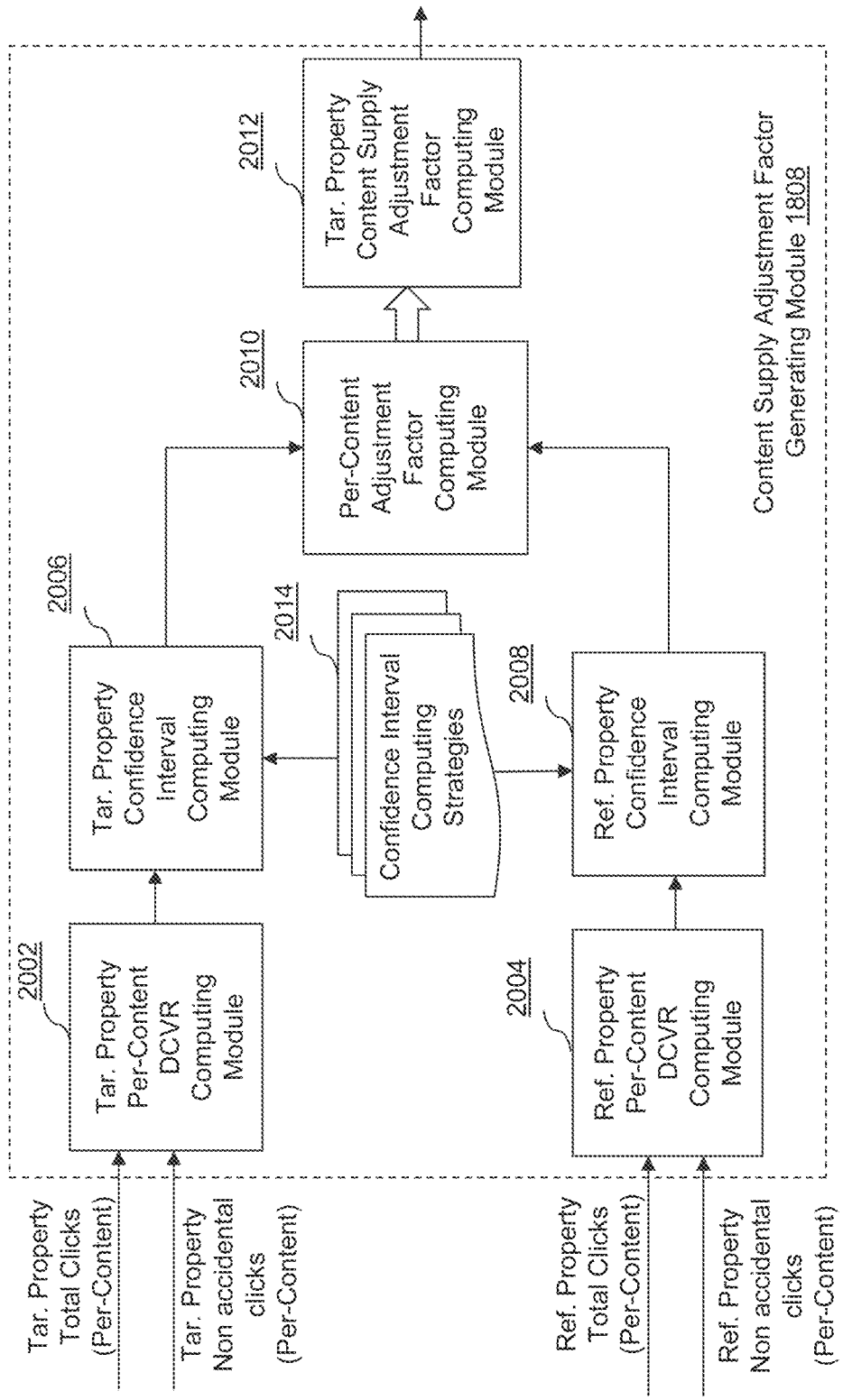
FIG. 20 illustrates an exemplary system diagram of a content supply adjustment factor generating module, according to another embodiment of the present teaching.

FIG. 20 illustrates an exemplary system diagram of a content supply adjustment factor generating module, according to another embodiment of the present teaching. The content supply adjustment factor generating module 1808 shown in FIG. 18 may include a target property per-content DCVR (click to conversion rate based on estimation of the dwell time) computing module 2002, a reference property per-content DCVR computing module 2004, a target property confidence interval computing module 2006, a reference property confidence interval computing module 2008, a per-content adjustment factor computing module 2010, and a target property content supply adjustment factor computing module 2012.

In some embodiments, a few assumptions are made to compute a content supply adjustment factor, for example, The content items placed on both the reference property and the target property are online advertisements;

Let VFC, bid denote the advertiser's value for conversion and bid respectively;

Let $click_1$, $NAclick_1$ denote the total and non-accidental clicks occurred on the target property;

Let $click_2$, $NAclick_2$ denote the total and non-accidental clicks occurred on the reference property;

Let $conv_1$ denote the total conversions occurred on the target property;

Let $CVR_1$ denote the click to conversion rate related to the target property;

Let $CVR_2$ denote the click to conversion rate related to the reference property;

Let $DCVR_1$ denote the click to conversion rate based on estimation of the dwell time related to the target property; and Let $DCVR_2$ denote the click to conversion rate based on estimation of the dwell time related to the reference property.

The content supply adjustment factor is computed by evaluating the following equations:

$$\frac{VFC_1 \times Conv_1}{bid_1 \times click_1} = \frac{VFC_1 \times CVR_1}{bid_1} \quad (5)$$

$$\frac{VFC_1 \times CVR_1}{bid_1} = \frac{VFC_2 \times CVR_2}{bid_2} \quad (6)$$

$$\frac{bid_1}{bid_2} = \frac{CVR_1}{CVR_2} = \frac{\frac{\Sigma NAclick_1}{\Sigma click_1}}{\frac{\Sigma NAclick_2}{\Sigma click_2}} = \frac{DCVR_1}{DCVR_2} \quad (7)$$

The goal of the evaluation is that the advertiser's return on investment (ROI) from Equation 5 should be the same for all syndication partners or properties. As the advertiser's actual cost for placing the advertisements on the target property cannot exceed the bids, Equation 5 thus represents the worst case ROI. Equation 7 is applied to discount the bids in proportion to the click to conversion rates CV R. In some embodiments when the actual click to conversion rate is not available, it is replaced with the ratio of non-accidental clicks to total clicks as ceteris paribus longer dwell times may result in higher ratios of conversion. Non-accidental clicks are defined as those clicks having associated dwell time greater than the referenced measurement threshold described foregoing.

The content supply adjustment factor generating module 1808 may select a computing strategy from a plurality of confidence interval computing strategies 2014. There are several ways to compute a confidence interval for a binomial proportion. For example, a normal approximation interval is the simplest formula based on an approximation but does not always perform well. Several competing formulas are available that perform better, especially for situations with a small sample size and a proportion very close to zero or one. The selection of confidence interval computing strategy may depend on one or more factors, such as, how important it is to use a simple and easy-to-explain interval versus the desire for better accuracy. In some embodiments, the theory of Agresti-Coull Interval is introduced to compute the confidence intervals. The Agresti-Coull Interval is given by:

$$\tilde{n} = n + z^2 \quad (8)$$

$$\tilde{p} = \frac{1}{\tilde{n}}\left(X + \frac{1}{2}z^2\right) \quad (9)$$

Then a confidence interval for p is given by $$\tilde{p} \pm z\sqrt{\frac{1}{\tilde{n}}\tilde{p}(1-\tilde{p})} \quad (10)$$

Where z is the $1-\frac{1}{2}\alpha$ percentile of a standard normal distribution. For example, for a 95% confidence interval, let $\alpha=0.05$, so $z=1.96$, $z^2=3.84$. If 2 is used instead of 1.96 for z, this is an "add 1 success and 2 failures" interval.

Figure 21:
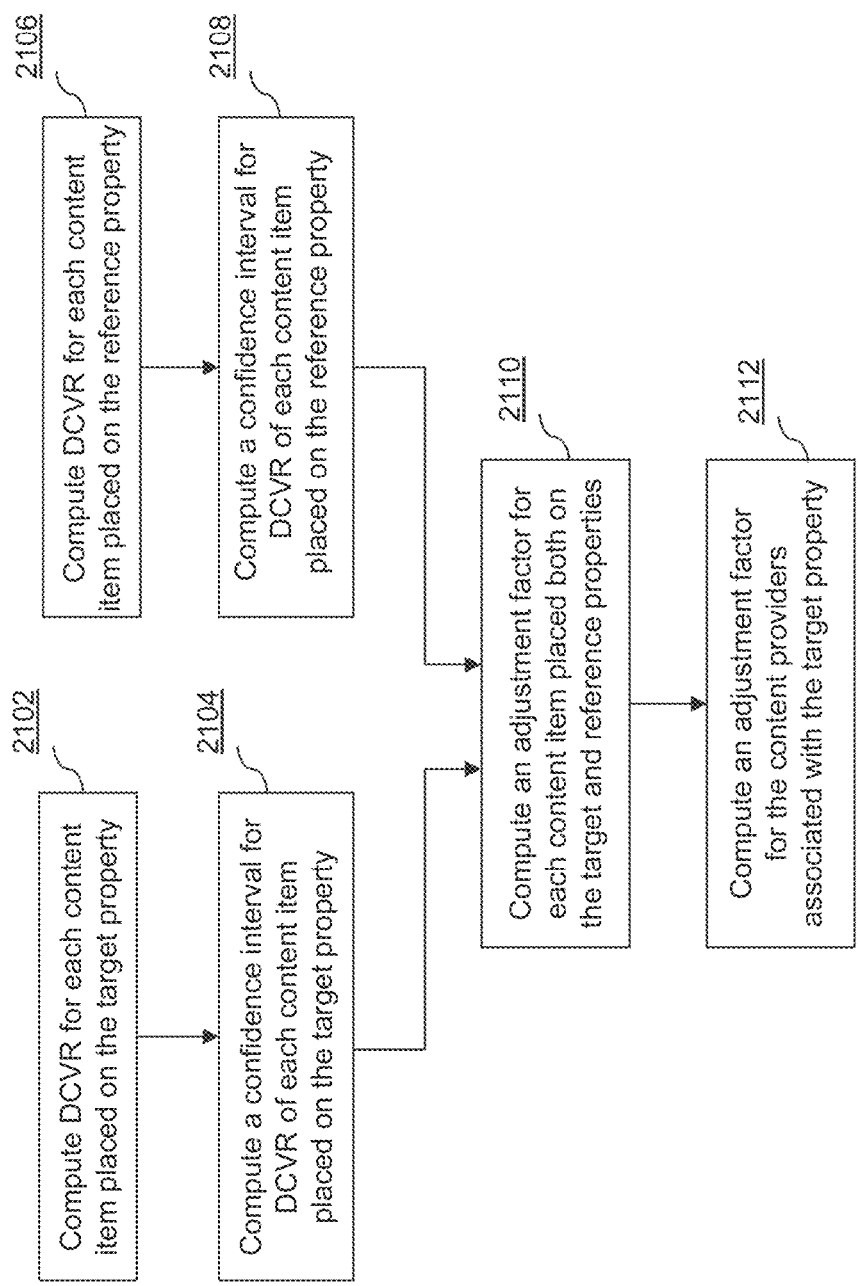
FIG. 21 illustrates an exemplary flowchart of the process for generating a content supply adjustment factor, according to another embodiment of the present teaching.

FIG. 21 illustrates an exemplary flowchart of the process for generating a content supply adjustment factor, according to another embodiment of the present teaching. The process for generating a content supply adjustment factor may include step 2102 for computing DCVR for each content item placed on the target property, step 2104 for computing a confidence interval for DCVR of each content item placed on the target property, step 2106 for computing DCVR for each content item placed on the reference property, step 2108 for computing a confidence interval for DCVR of each content item placed on the reference property, step 2210 for computing an adjustment factor for each content item placed on both the target property and the reference property based on the confidence intervals for DCVR related to the reference property and the target property, and step 2112 for computing an adjustment factor for the content providers associated with the target property.

Figure 22:
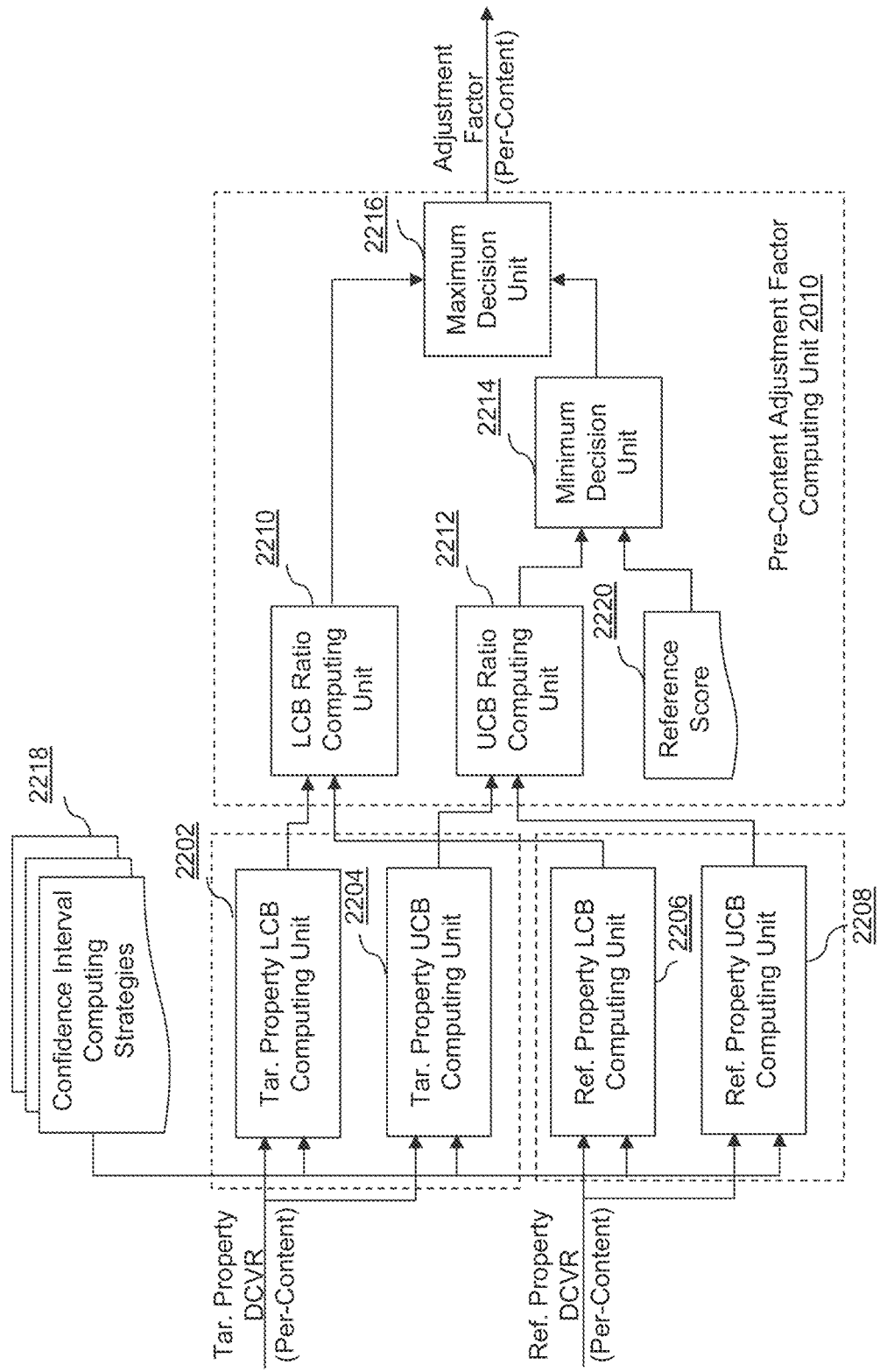
FIG. 22 illustrates an exemplary system diagram of a per-content adjustment factor computing unit, according to another embodiment of the present teaching.

FIG. 22 illustrates an exemplary system diagram of a per-content adjustment factor computing unit, according to another embodiment of the present teaching. According to the illustrated embodiment, the per-content adjustment factor computing unit 2010 shown on FIG. 20 may include a target property LCB (lower confidence bound) computing unit 2202, a target property UCB (upper confidence bound) computing unit 2204, a reference property LCB (lower confidence bound) computing unit 2206, a reference property UCB (upper confidence bound) computing unit 2208, an LCB ratio computing unit 2210, a UCB ratio computing unit 2212, a minimum decision unit 2214, and a maximum decision unit 2216. For each content item, i.e., advertisement, placed on the target property, the computed DCVR is sent to the target property LCB computing unit 2202 and the UCB computing unit 2204; and for each content item, i.e., advertisement, placed on the reference property, the computed DCVR is sent to the reference property LCB computing unit 2206 and the UCB computing unit 2208. The LCB and UCB computation is based on a computing strategy selected from a plurality of confidence interval computing strategies 2218, for example, the Agresti-Coull Interval estimation. Once the LCBs and UCBs for the content items placed on both the reference property and the target property are calculated, the LCB ratio computing unit 2210 obtains the two LCB values for the content items placed on both the reference property and the target property to compute a LCB ratio between the reference property and the target property, and the UCB ratio computing unit 2212 obtains the two UCB values for the content items placed on both the reference property and the target property to compute a UCB ratio between the reference property and the target property. The minimum decision unit 2214 is configured to compare the UCB ratio with a reference score 2220, and provide a minimum value to the maximum decision unit 2216. The maximum decision unit 2216 is configured to compare the minimum value with the LCB ratio, and provide a maximum value as the adjustment factor for the content item.

The target property may adjust the PPC in proportion to the performance, which is typically measured by click to conversion rates (CVR). By comparing the CVR performance related to the target property and the reference property, the business operator can determine an appropriate adjustment factor for the PPC cost that the content providers will pay to place the contents in the target property. Quite often, CVR data associated with a particular property is not available because the business operators do not want to share business-related information. Therefore, in the present embodiment, DCVR, a CVR based on estimated dwell time threshold is used for evaluation of the performance of the target property and the reference property. In some embodiments, the CVR ratio between a target property and a reference property may be estimated using the following equation:

$$\frac{DCVR_1}{DCVR_2} = \frac{UCB(DCVR_1)}{UCB(DCVR_2)} \quad (11)$$

where UCB indicates the upper confidence bound computed by the Agesti-Coull interval (Equation 10). However, if the Agesti-Coull Interval estimation is used to identify a target property that is over-performing in traffic quality, scores greater than 1 has to be assigned only when we have a degree of confidence in it. One way to operationalize this confidence is to require that the target property's lower confidence bound LCB be greater than the reference property's LCB. Therefore, Equation 11 is modified as:

$$\frac{DCVR_1}{DCVR_2} = \max\left(\frac{LCB(DCVR_1)}{UCB(DCVR_2)}, \min\left(\frac{UCB(DCVR_1)}{UCB(DCVR_2)}, 1\right)\right) \quad (12)$$

Several characters are observed from Equation 12, which are:
In case of large sample with non-zero conversions, the ratio of conversions will converge to ratio of simple estimator that does not use confidence bounds (MLE).
In case of small sample size, the ratio of conversions will be close to 1 indicating that there is no enough data to suggest that the target property is any different from the reference property.
There still needs a minimum number of trials (or in the case of success) for Equation 12 to produce sensible results. If the number of clicks is too low, the results are not reliable.

Figure 23:
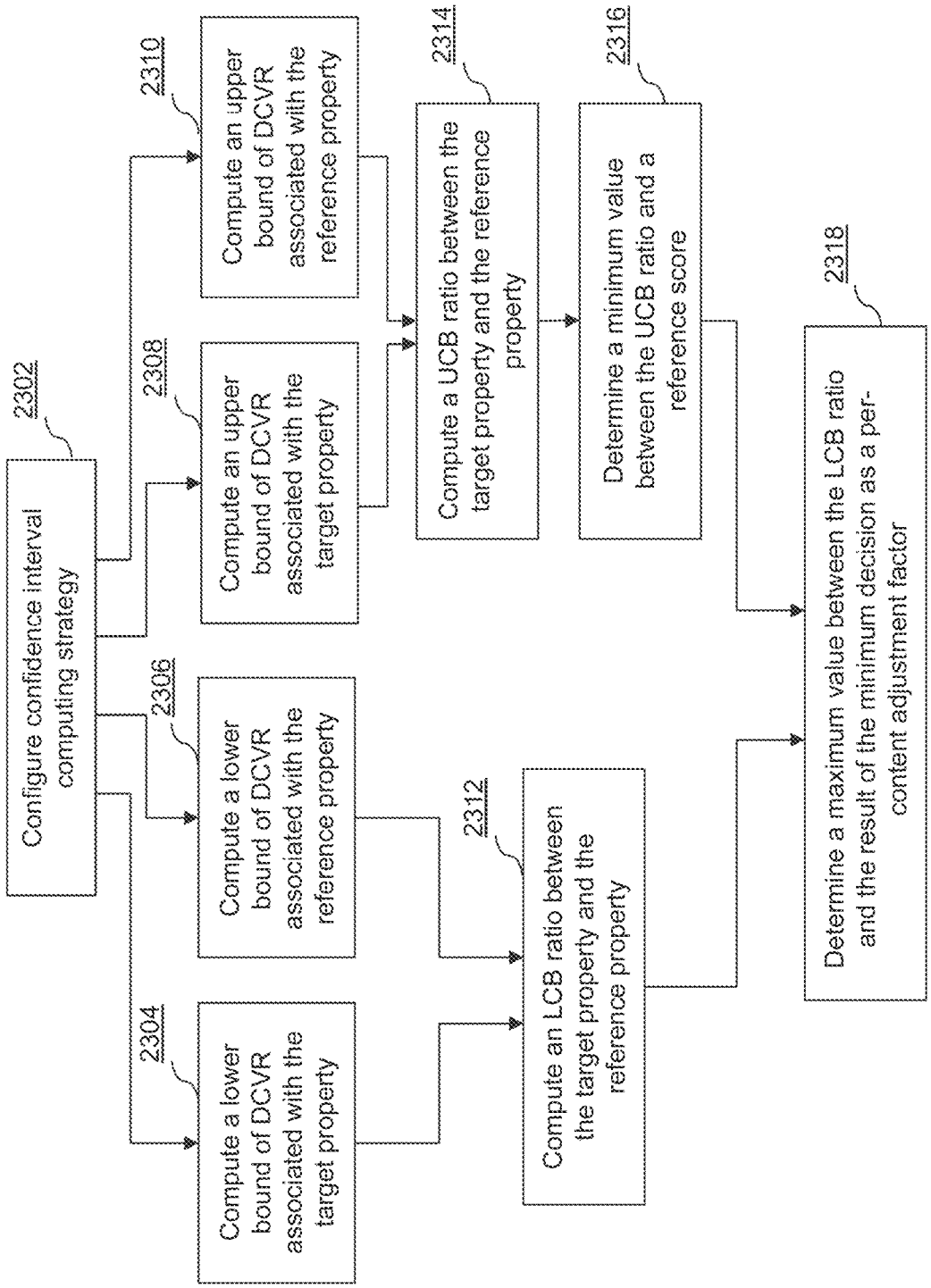
FIG. 23 illustrates an exemplary flowchart of the process for computing a per-content adjustment factor, according to another embodiment of the present teaching.

FIG. 23 illustrates an exemplary flowchart of the process for computing a per-content adjustment factor, according to another embodiment of the present teaching. The process for computing a per-content adjustment factor may include step 2302 for configuring confidence interval computing strategy, step 2304 for computing a lower confidence bound of DCVR associated with the target property, step 2306 for computing a lower confidence bound of DCVR associated with the reference property, step 2308 for computing an upper confidence bound of DCVR associated with the target property, step 2310 for computing an upper confidence bound of DCVR associated with the reference property, step 2312 for computing an LCB ratio between the target property and the reference property, step 2314 for computing a UCB ratio between the target property and the reference property, step 2316 for determining a minimum value between the UCB ratio and a reference score, and step 2318 for determining a maximum value between the LCB ratio and the result of the minimum decision and providing it as a per-content adjustment factor.

Figure 24:
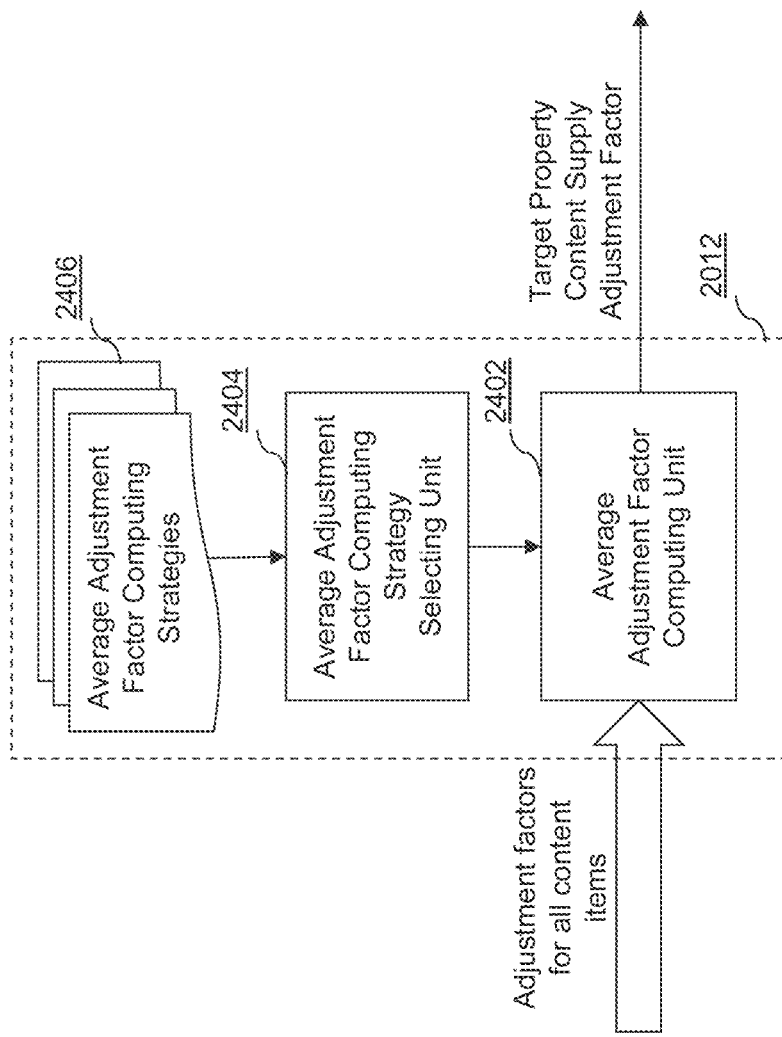
FIG. 24 illustrates an exemplary system diagram of a target property content supply adjustment factor computing module, according to another embodiment of the present teaching.

FIG. 24 illustrates an exemplary system diagram of a target property content supply adjustment factor computing module, according to another embodiment of the present teaching. The target property content supply adjustment factor 2012 shown in FIG. 20 may include an average adjustment factor computing unit 2402 and an average adjustment factor computing strategy selecting unit 2404 configured to select a computing strategy from a plurality of average adjustment factor computing strategies 2406. The computing strategy may include but not limited to mean or median of all individual adjustment factors computed for each content items placed on the target property.

Figure 25:
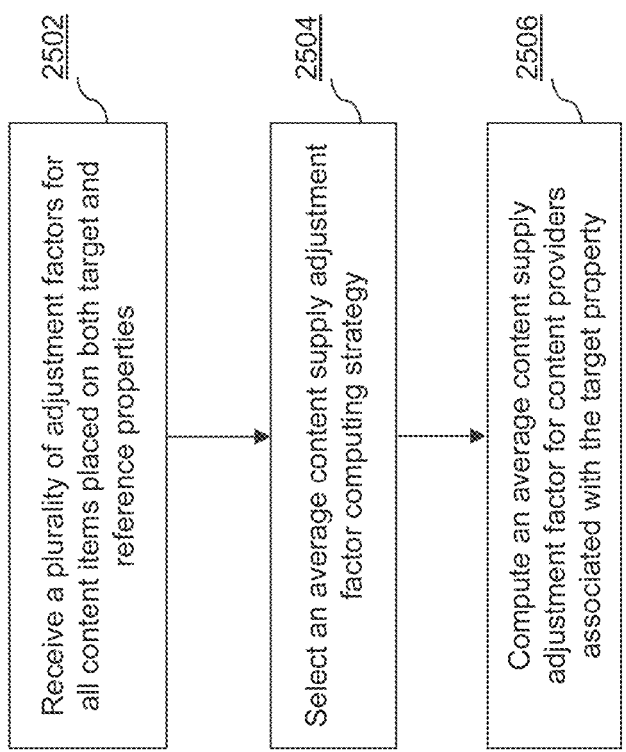
FIG. 25 illustrates an exemplary flowchart of the process for computing an average content supply adjustment factor for content providers associated with the target property, according to another embodiment of the present teaching.

FIG. 25 illustrates an exemplary flowchart of the process for computing an average content supply adjustment factor for content providers associated with the target property, according to another embodiment of the present teaching. The process for computing an average content supply adjustment factor for content providers associated with the target property may include step 2502 for receiving a plurality of adjustment factors for all content items placed on both target and reference properties, step 2504 for selecting an average content supply adjustment factor computing strategy, and step 2506 for computing an average content supply adjustment factor for content providers associated with the target property.

V. From Non-Accidental Clicks Ratio to Adjustment Factors

In some embodiments, to compute the cost adjustment factor for a new target property, the median (or mean) of the non-accidental clicks ratio for all advertiser that have shown advertisements on both the new target property and the reference property is computed. Observations that had fewer than M IN CLICK clicks are discarded. In some embodiments, the value of M IN CLICK is set in a range of 20 to 40 per advertisement. A brief algorithm procedure is described herein below:

| Algorithm 1 Discount Factor |
|---|
| 1: procedure DISCOUNT(ads) |
| 2:    for Ad ∈ [ads] do |
| 3:       Clicks ← $Clicks_{Ad}$ |
| 4:       N AClicks ← N $AClicks_{Ad}$ |
| 5:       if $|Clicks_{Ad}|$ ≥ M IN CLICK then |
| 6:          score ← Equation8 |
| 7:       end if |
| 8:    end for |
| 9:    discount ← M edian(score) |
| 10:    return discount    ▷ The discount for the target property |
| 11 : end procedure |

VI. From Dwell Time to Conversions

Experiments are performed to investigate the relation between the dwell time on a landing page and conversion on the landing page for 40 campaigns. The experiments use a random coefficients models to account for both the heterogeneity in base conversion rates and marginal impact of dwell time. It is observed that the logarithm of a dwell time has a significant impact on driving conversions. This provides empirical justification for using dwell time as a conversion signal.

Basic Models for the experiments are chosen as:

$$y_{i,j} = \alpha_0 + \alpha_i + (\beta_0 + \beta_i) \text{dwell}_{i,j} + e_{i,j} \quad (13)$$

$$y_{i,j} = \text{logit}(\alpha_0 + \alpha_i + (\beta_0 + \beta_i) \text{dwell}_{i,j} + e_{i,j} \quad (14)$$

The experiments employ basic aggregate statistics on the log of dwell time. FIG. 26 illustrates an exemplary aggregated statistics of the logarithm distribution of the user interaction measurements, according to another embodiment of the present teaching. The experiments reject the null hypothesis that the mean of the dwell time is the same for conversions and non-conversions, and keep the hypothesis that the dwell time for case of conversions is higher than the dwell time for no conversions for analysis.

FIG. 27 illustrates an exemplary regression coefficients for different specifications associated with the dwell time to conversion, according to another embodiment of the present teaching. It is observed that the log of the dwell time is significantly correlated with the conversion. The best fit is from Logit with dummy variables for campaigns.

Figure 28:
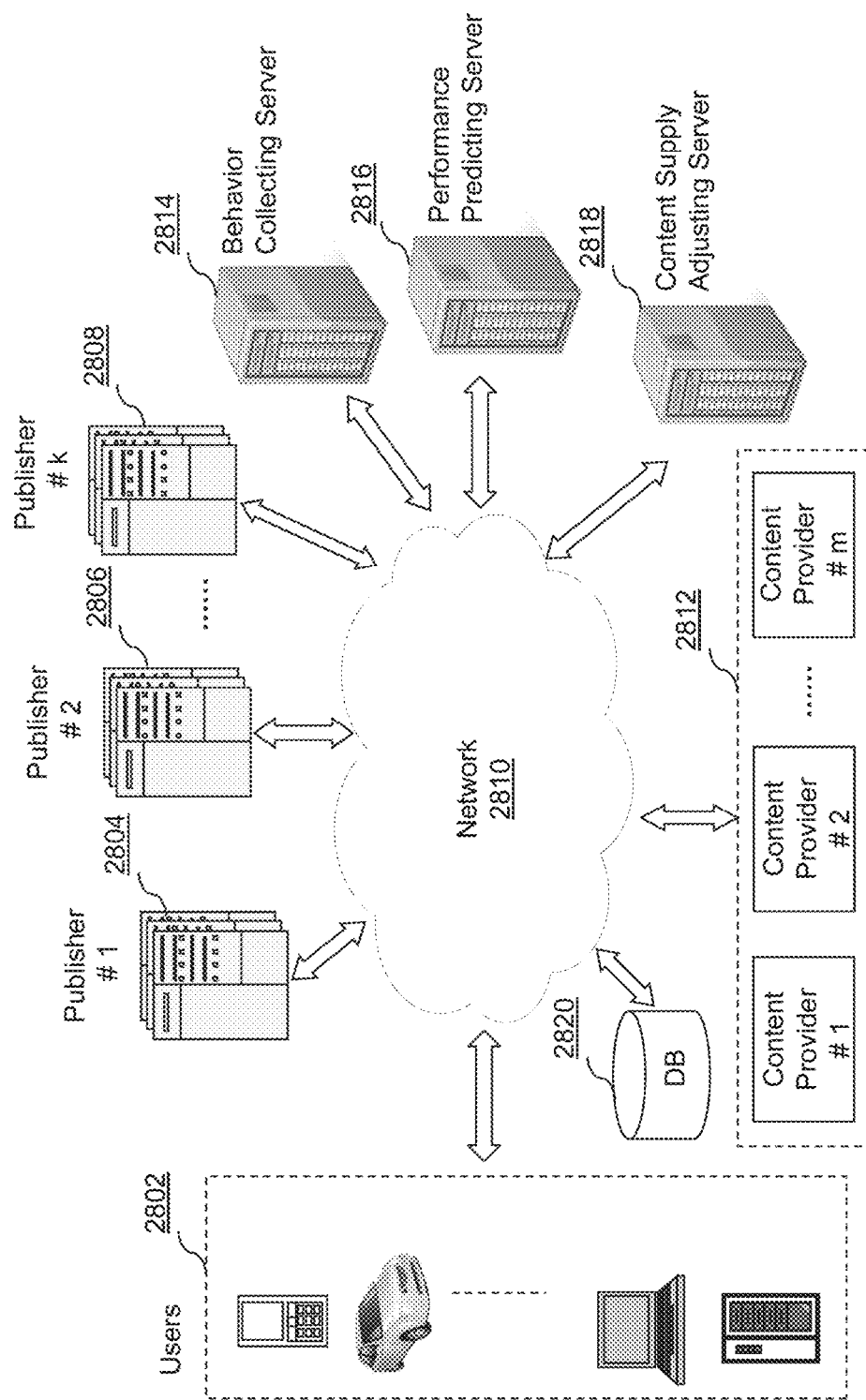
FIG. 28 illustrates an exemplary high level system diagram of analyzing the user interactions associated with the contents and implementing the analyzed result to provide content supply adjustment to the providers, according to an embodiment of the present teaching.

FIG. 28 illustrates an exemplary high level system diagram of analyzing the user interactions associated with the contents and implementing the analyzed result to provide content supply adjustment to the providers, according to an embodiment of the present teaching. The user 2802 may access the contents placed on any publisher web site (2804, 2806 . . . 2808) via a network 2810. Content items placed on the publisher web sites are provided by a plurality of content providers 2812 via the network 2810. The system further includes a behavior collecting server 2814, a performance predicting server 2816, and a content supply adjusting server 2818. The behavior collecting server 2814 is configured to collect user behavior or user interactions related to content items placed on the plurality of publisher web sites via the network 2810. The collected information may be stored locally in a database connected to the behavior collecting server 2814, or a network database 2820. The performance predicting server 2816 is configured to predict the performance of the content items placed on the plurality of publisher web sites using the collected behavior information. The content supply adjusting server 2818 is configured to evaluate the performance of the content items placed on both a reference property and a target property based on the collected behavior information, and determine whether to provide a cost adjustment to the content providers.

The user 2802 may connect to the network via various types of devices, for example, a desktop computer, a laptop computer, a mobile device, a built-in device in a motor vehicle, etc. The network 2810 may be a single network or a combination of multiple networks. For example, the network 2810 may be a local area network (LAN), a wide area network (WAN), a public network, a private network, a proprietary network, a Public Telephone Switched Network (PSTN), the Internet, a wireless communication network, a virtual network, or any combination thereof. The publisher 2804, 2806, and 2808 may be any entity that hosts one or more content items in its properties (e.g., web sites, applications, etc.). The publisher 2804, 2806, and 2808 may also be a search engine, a blogger, a television station, a newspaper issuer, a web page host, a content portal, an online service provider, or a game server. The content provider 2812 may be any entity that provides contents to be displayed on the publisher's webpage. The content provider 2812 may be an advertiser that provides inventory to be placed on the publisher's webpage, such as electrical devices, fashion items, soft drinks, travel services, merchandize coupons etc.

Figure 29:
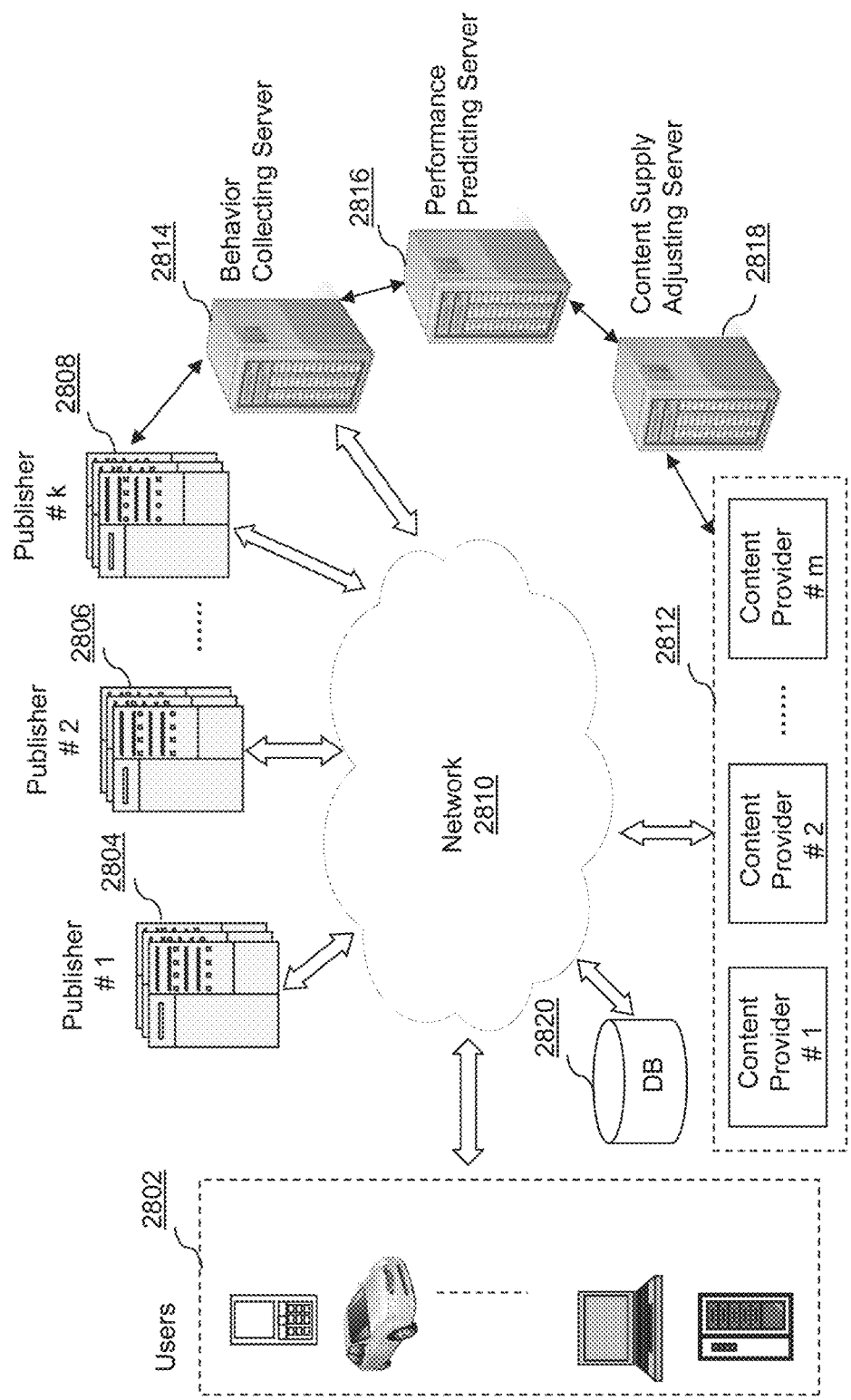
FIG. 29 illustrates an exemplary high level system diagram of analyzing the user interactions associated with the contents and implementing the analyzed result to provide content supply adjustment to the providers, according to another embodiment of the present teaching.

FIG. 29 illustrates an exemplary high level system diagram of analyzing the user interactions associated with the contents and implementing the analyzed result to provide content supply adjustment to the providers, according to another embodiment of the present teaching. The system environment illustrated herewith is similar to FIG. 28, except that the performance predicting server 2816 and the content supply adjusting server 2818 may operate as back-end systems for analyzing the performance of content items placed on a target property and providing cost adjustment to the content providers associated with the target property. In some embodiment, the performance predicting server 2816 and the content supply adjusting server 2818 may be incorporated into the behavior collecting server 2814 as one entity.

Figure 30:
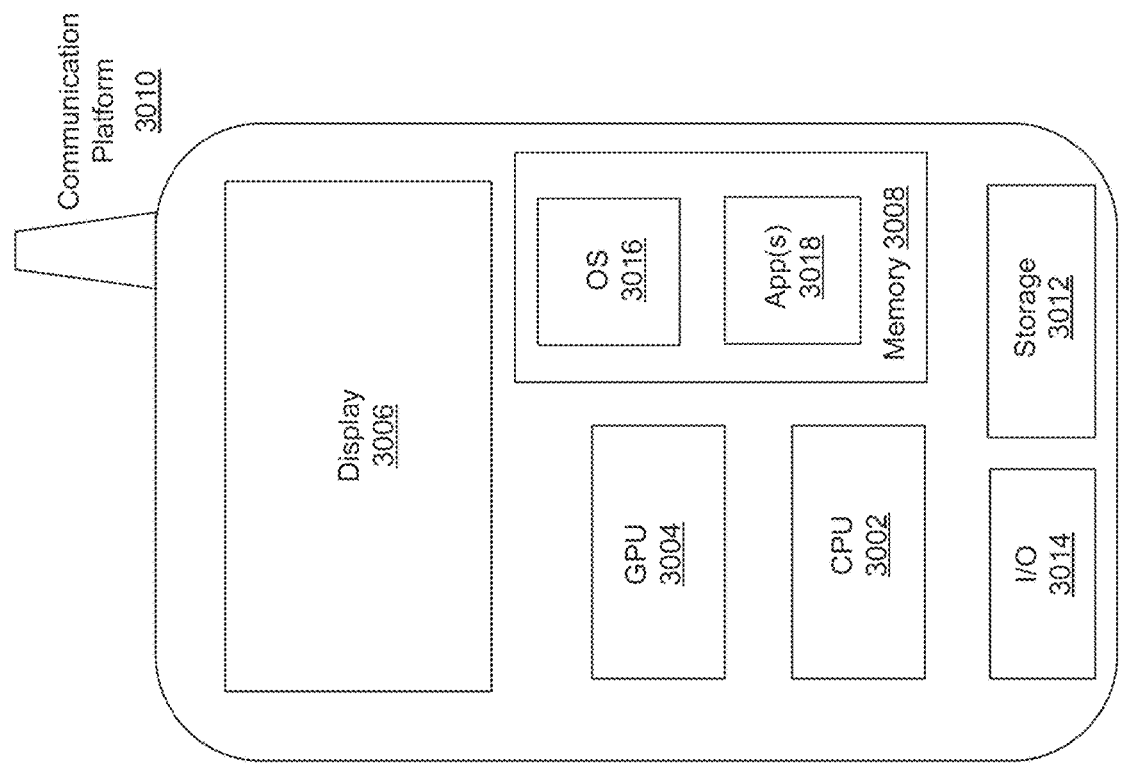
FIG. 30 illustrates a general mobile device architecture on which the present teaching can be implemented.

FIG. 30 illustrates a general mobile device architecture on which the present teaching can be implemented. In some embodiments, the user device is a mobile device, including but is not limited to, a smart phone, a tablet, a music player, a handled gaming console, a global positioning system (GPS) receiver, a smart-TV, wearable devices, etc. The mobile device may include one or more central processing units (CPUs) 3002, one or more graphic processing units (GPUs) 3004, a display 3006, a memory 3008, a communication platform 3010, such as a wireless communication module, storage 3012, and one or more input/output (I/O) devices 3014. Any other suitable component, such as but not limited to a system bus or a controller (not shown), may also be included in the mobile device. In some embodiments, a mobile operating system 3016, e.g., iOS, Android, Windows Phone, etc., and one or more applications 3018 may be loaded into the memory 3008 from the storage 3012 in order to be executed by the CPU 3002. The applications 3018 may include a browser or any other suitable mobile apps for collecting user behavior information associated with the content items placed on a property. Execution of the applications 3018 may cause the mobile device to perform the processing as described above in the present teaching. For example, collecting user behavior information associated with the content items placed on a property may be made by the GPU 3004 in conjunction with the display 3006.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 31:
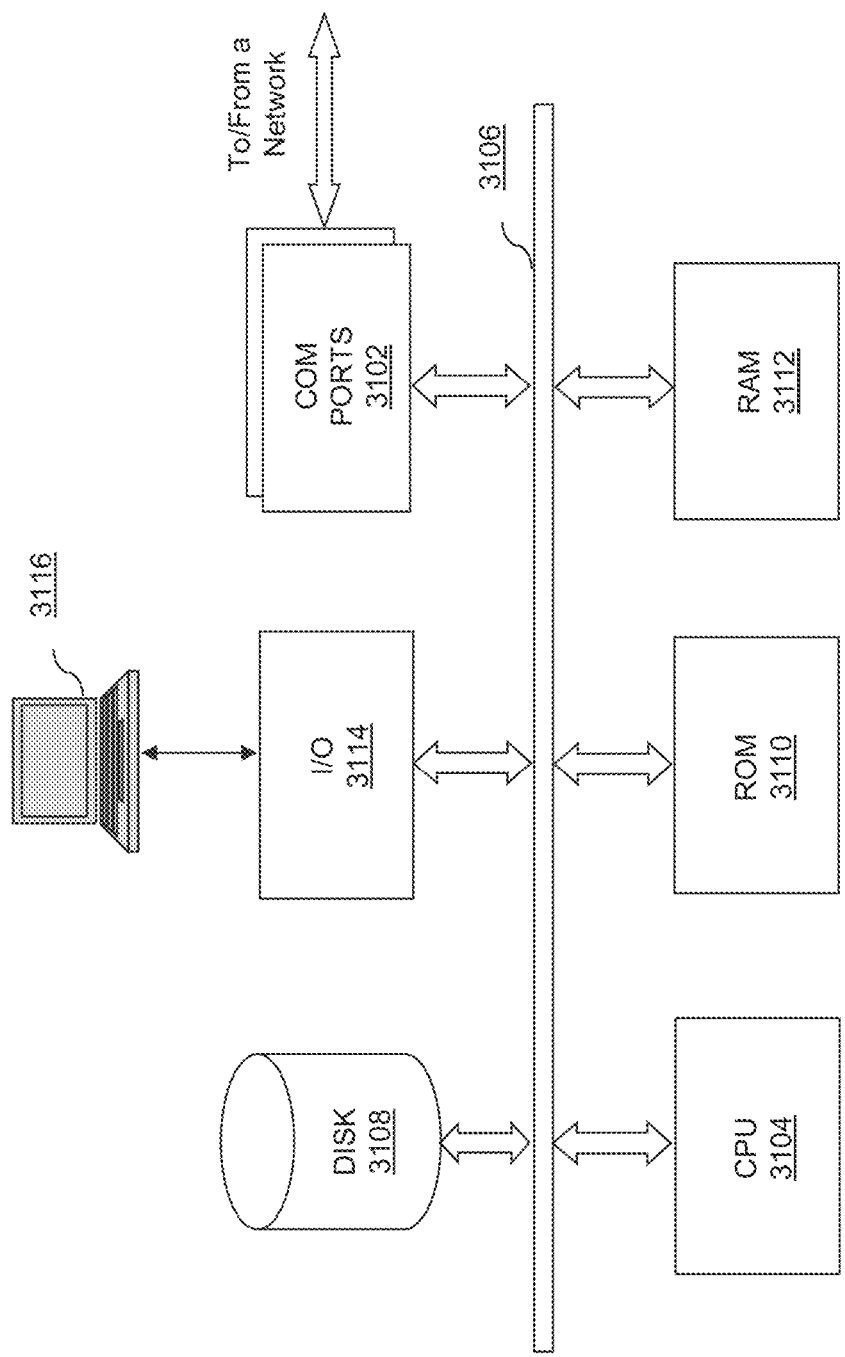
FIG. 31 illustrates a general computer architecture on which the present teaching can be implemented.

FIG. 31 illustrates a general computer architecture on which the present teaching can be implemented. The computer may be a general-purpose computer or a special purpose computer. This computer can be used to implement any components of the system for analyzing user behavior associated with the content items placed on a property, and providing content supply adjustment as described herein. Different components of the systems disclosed in the present teaching can all be implemented on one or more computers such as computer, via its hardware, software program, firmware, or a combination thereof. Although only one such computer is shown, for convenience, the computer functions relating to placing the sponsored search results page may be implemented in a distributed fashion on a number of similar platforms, to distribute the processing load.

The computer, for example, includes COM ports 3102 connected to and from a network connected thereto to facilitate data communications. The computer also includes a CPU 3104, in the form of one or more processors, for executing program instructions. The exemplary computer platform includes an internal communication bus 3106, program storage and data storage of different forms, e.g., disk 3108, read only memory (ROM) 3110, or random access memory (RAM) 3112, for various data files to be processed and/or communicated by the computer, as well as possibly program instructions to be executed by the CPU 3104. The computer also includes an I/O component 3114, supporting input/output flows between the computer and other components therein such as user interface elements 3116. The computer may also receive programming and data via network communications.

Hence, aspects of the methods of analyzing user behavior associated with web contents, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one computing device each of which has at least one processor, storage, and a communication platform connected to a network for analyzing user behavior associated with web contents, the method comprising:
   in response to user interactions associated with a content item placed on a reference webpage, redirecting the user from the reference webpage to a landing webpage associated with the content item;
   obtaining, via a web-application embedded in the reference webpage, information related to the user interactions associated with the content item placed on the reference webpage;
   filtering the information by removing a part of the information that is associated with user interactions having dwell time greater than a first threshold, wherein the remaining part of the information is associated with user interactions including a first type of clicks and a second type of clicks on the content item, and wherein the first type only indicates no post click engagement and the second type indicates at least some post click engagement;
   determining, based on the remaining part of the information, dwell times associated with the first and second types of clicks;
   generating, based on the dwell times, a dwell time distribution for the first type of clicks;
   determining dynamically, based on the dwell time distribution,
      a second threshold associated with the first type of clicks with respect to the content item, wherein the dwell times of the first type of clicks are less than the second threshold and the dwell times of the second type of clicks are greater than the second threshold, and
      a first ratio related to the second type of clicks on the content item placed on the reference webpage;
   estimating, based on the second threshold, a second ratio related to the second type of clicks on the content item being placed on a target webpage;
   computing, based on the first ratio and the second ratio, an adjustment factor for determining an award for placing the content item on the target webpage, wherein the target webpage is different from the reference webpage; and
   providing the content item on the target webpage, wherein the adjustment factor is provided therewith.

2. The method of claim 1, further comprising:
   selecting a plurality of statistical models;
   generating the dwell time distribution by combining the plurality of statistical models; and
   estimating one or more parameters associated with statistics corresponding to the at least one of the first type clicks or the second type of clicks.

3. The method of claim 2, wherein a number of statistical models of the plurality of statistical models is equal to three, and a number of types of clicks that the dwell time distribution is capable of corresponding to is equal to three.

4. The method of claim 2, further comprising:
   computing a median of the first type of clicks associated with the statistics, and
   setting the median of the first type of clicks to be the second threshold.

5. The method of claim 1, wherein the first type of clicks comprises accidental clicks, and the second type of clicks comprises non-accidental clicks, the method further comprising:
   selecting a set of measurements associated with the content item whose statistics exhibit the accidental clicks and the non-accidental clicks, wherein the dwell time distribution comprises distributions for the accidental clicks and the non-accidental clicks, respectively;
   computing a statistical value of the first type of clicks associated with the statistics of the set of measurements; and
   setting the statistical value of the first type of clicks to be the second threshold.

6. The method of claim 5, wherein the statistical value of the first type of clicks is a mean of the first type of clicks.

7. The method of claim 1, further comprising:
   determining thresholds for all content items placed on the reference webpage; and
   estimating a reference threshold to be used to determine an average cost of placing a first content item on the target webpage based on the reference threshold.

8. The method of claim 7, wherein the reference threshold is estimated by one of:
   computing a mean of the thresholds for all content items placed on the reference webpage to be the reference threshold; and
   computing a median of the thresholds for all content items placed on the reference webpage to be the reference threshold.

9. The method of claim 1, wherein the first ratio is a ratio of a number of the second type of clicks on the content item placed on the reference webpage to a total number of clicks on the content item placed on the reference webpage, and the second ratio is a ratio of a number of the second type of clicks on the content item placed on the target webpage to a total number of clicks on the content item placed on the target webpage.

10. The method of claim 1, wherein the content item includes at least one uniform resource locator (URL) embedded therein, wherein the URL re-directs the user to another webpage upon the user clicking the content item.

11. The method of claim 1, wherein the adjustment factor is further computed based on a first pair of confidence measures determined with respect to the reference page and a second pair of confidence measures determined with respect to the target page.

12. A system having at least one processor, storage, and a communication platform connected to a network for analyzing user behavior associated with web contents, the system comprising:
   a user interactions sampler implemented by a processor and configured to in response to user interactions, associated with a content item placed on a reference webpage, causing redirecting the user from the reference webpage to a landing webpage associated with the content item, obtain, via a web-application embedded in the reference webpage, information related to the user interactions associated with the content item placed on the reference webpage;
   a filter implemented by the processor and configured to filter the information by removing a part of the information that is associated with user interactions having dwell time greater than a first threshold, wherein the remaining part of the information is associated with user interactions including a first type of clicks and a second type of clicks on the content item, and wherein the first type only indicates no post click engagement and the second type indicates at least some post click engagement;

a measurement extracting module implemented by the processor and configured to determine, based on the remaining part of the information, dwell times associated with the first and second types of clicks;

a measurement statistics categorizing unit implemented by the processor and configured to generate, based on the dwell times, a dwell time distribution for the first type of;

a threshold estimator implemented by the processor and configured to determine dynamically, based on the dwell time distribution,
  a second threshold associated with the first type of clicks with respect to the content item, wherein the dwell times of the first type of clicks are less than the second threshold and the dwell times of the second type of clicks are greater than the second threshold, and
  a first ratio related to the second type of clicks on the content item placed on the reference webpage;

a first statistic estimator implemented by the processor and configured to estimate, based on the second threshold, a second ratio related to the second type of clicks on the content item being placed on a target webpage; and a content supply adjustment factor unit implemented by the processor and configured to:
  compute, based on the first ratio and the second ratio, an adjustment factor for determining an award for placing the content item on the target webpage, wherein the target webpage is different from the reference webpage; and
  cause the content item to be provided on the target webpage, wherein the adjustment factor is provided therewith.

13. The system of claim 12, further comprising:
a model selecting unit implemented by the processor and configured to select a plurality of statistical models, wherein the measurement statistics categorizing unit is further configured to generate the dwell time distribution by combining the plurality of statistical models; and
a parameter estimator implemented by the processor and configured to estimate one or more parameters associated with statistics corresponding to the at least one of the first type clicks or the second type of clicks.

14. The system of claim 13, wherein the threshold estimator is further configured to:
compute a median of the first type of clicks of the statistics; and
set the median of the first type of clicks to be the second threshold.

15. The system of claim 12, wherein the first type of clicks comprises accidental clicks and the second type of clicks comprises non-accidental clicks, and wherein the threshold estimator is further configured to:
select a set of measurements associated with the content item whose statistics exhibit the accidental clicks and the non-accidental clicks, wherein the dwell time distribution comprises distributions for the accidental clicks and the non-accidental clicks, respectively;
compute a statistical value of the first type of clicks associated with the statistics of the set of measurements; and
set the statistical value of the first type of clicks to be the second threshold.

16. The system of claim 12, wherein the threshold estimator is further configured to:
determine thresholds for all content items placed on the reference webpage; and
estimate a reference threshold to be used to determine an average cost of placing a first content item on the target webpage based on the reference threshold.

17. The system of claim 16, wherein the reference measurement threshold is estimated by one of:
computing a mean of the thresholds for all content items placed on the reference webpage to be the reference threshold; and
computing a median of the thresholds for all content items placed on the reference webpage to be the reference threshold.

18. A non-transitory machine-readable medium having computer program instructions recorded thereon for analyzing user behavior associated with web contents, wherein the computer program instructions, when read by the machine, causes the machine to perform the following:
in response to user interactions associated with a content item placed on a reference webpage, redirecting the user from the reference webpage to a landing webpage associated with the content item;
obtaining, via a web-application embedded in the reference webpage, information related to the user interactions associated with the content item placed on the reference webpage;
filtering the information by removing a part of the information that is associated with user interactions having dwell time greater than a first threshold, wherein the remaining part of the information is associated with user interactions including a first type of clicks and a second type of clicks on the content item, and wherein the first type only indicates no post click engagement and the second type indicates at least some post click engagement;
determining, based on the remaining part of the information, dwell times associated with the first and second types of clicks;
generating, based on the dwell times, a dwell time distribution for the first type of;
determining dynamically, based on the dwell time distribution,
  a second threshold associated with the first type of clicks with respect to the content item, wherein the dwell times of the first type of clicks are less than the second threshold and the dwell times of the second type of clicks are greater than the second threshold, and
  a first ratio related to the second type of clicks on the content item placed on the reference webpage;
estimating, based on the second threshold, a second ratio related to the second type of clicks on the content item being placed on a target webpage;
computing, based on the first ratio and the second ratio, an adjustment factor for determining an award for placing the content item on the target webpage, wherein the target webpage is different from the reference webpage; and
providing the content item on the target webpage, wherein the adjustment factor is provided therewith.

19. The non-transitory machine-readable medium of claim 18, wherein the information, when read by the machine, causes the machine to further perform the following:
- selecting a plurality of statistical models;
- generating the dwell time distribution by combining the plurality of statistical models; and
- estimating one or more parameters associated with statistics corresponding to the at least one of the first type clicks or the second type of clicks.

* * * * *